United States Patent [19]

Uchidoi et al.

[11] 4,286,849
[45] Sep. 1, 1981

[54] DIGITAL CAMERA

[75] Inventors: Masanori Uchidoi, Yokohama; Masami Shimizu, Tokyo; Nobuaki Date; Hiroshi Aizawa, both of Kawasaki, all of Japan

[73] Assignee: Canon Kabushiki Kaisha, Tokyo, Japan

[21] Appl. No.: 9,806

[22] Filed: Feb. 6, 1979

[30] Foreign Application Priority Data

| Feb. 9, 1978 | [JP] | Japan | 53/14332 |
| Feb. 9, 1978 | [JP] | Japan | 53/14333 |
| Feb. 9, 1978 | [JP] | Japan | 53/14334 |
| Feb. 20, 1978 | [JP] | Japan | 53/18346 |
| Mar. 29, 1978 | [JP] | Japan | 53/36379 |

[51] Int. Cl.³ .................................................. G03B 7/097
[52] U.S. Cl. .................................. 354/23 D; 354/38; 354/217; 354/289
[58] Field of Search ............... 354/23 D, 36, 37, 38, 354/217, 289

[56] References Cited

U.S. PATENT DOCUMENTS

| 4,021,828 | 3/1977 | Iura et al. | 354/217 |
| 4,104,649 | 8/1978 | Tanaka et al. | 354/23 D X |
| 4,117,500 | 9/1978 | Kondo | 354/23 D |
| 4,174,888 | 11/1979 | Hunn et al. | 354/217 X |
| 4,175,842 | 11/1979 | Sakurada et al. | 354/23 D |

Primary Examiner—Michael L. Gellner
Attorney, Agent, or Firm—Toren, McGeady and Stanger

[57] ABSTRACT

A digital camera with five automatic exposure modes is provided with corresponding individual cards upon selective insertion into the camera to effect the operation of either or both of the shutter and diaphragm in accordance with the digital output of a computer through logic selection circuits as the mode information on the inserted card is read into a binary coded decimal counter controlling operation of the logic circuits. When the card is absent from the camera, a first controlling push button for sequential display of the modes is rendered effective to pass a pulse train to the counter so that upon release of the button, the current mode displayed can be set. The card further includes information relating to the determination of whether or not to give a sound warning signal which occurs, in one embodiment, when the film nears the terminal end of footage. In another embodiment, the buzzer is utilized to assist in releasing not only a first but also an additional three buttons for setting exposure factors and a number of film frames available just after a desired symbol or digital value appears in the display as they are sequentially presented.

68 Claims, 14 Drawing Figures

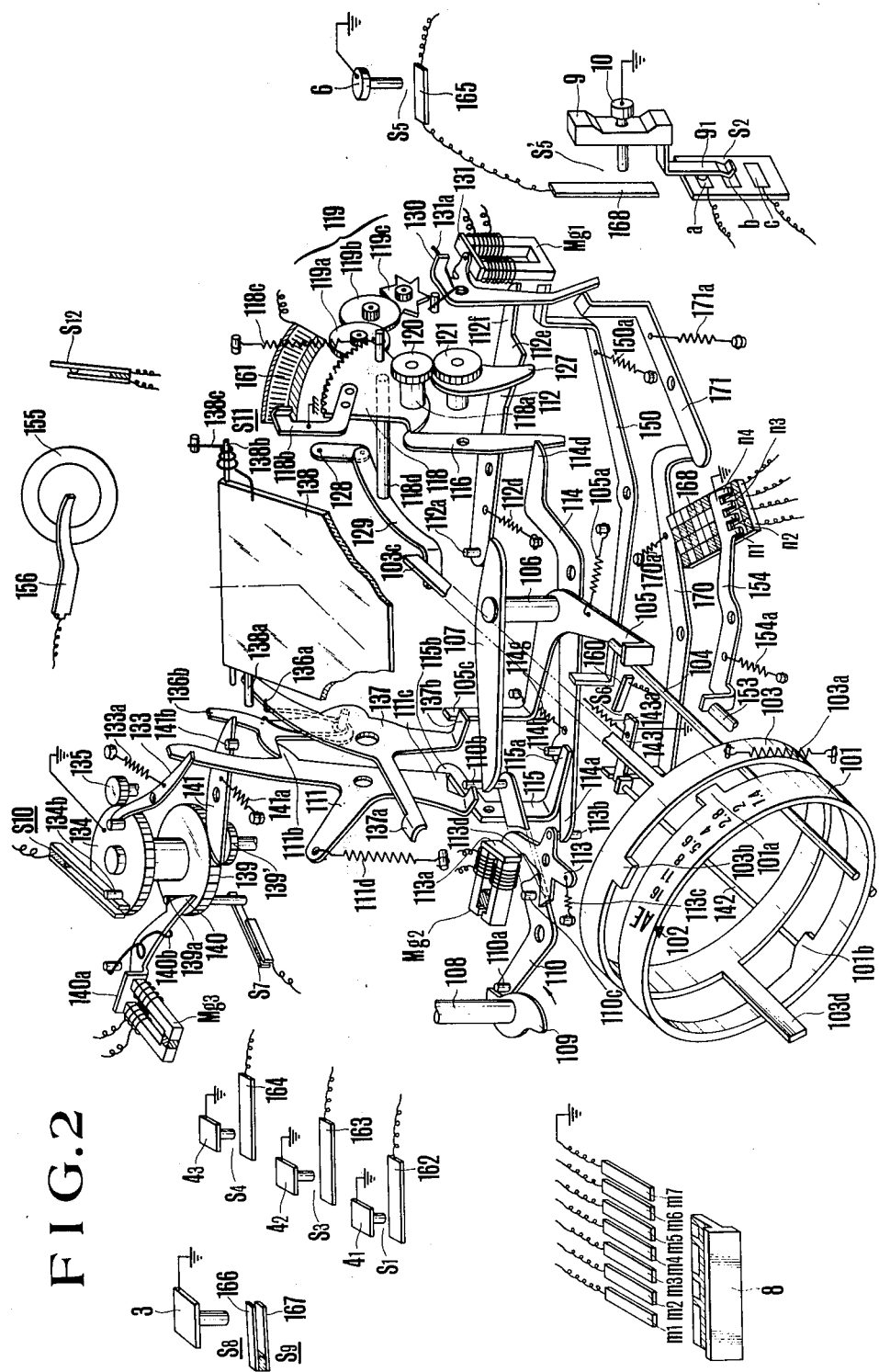

FIG. 5
(a) 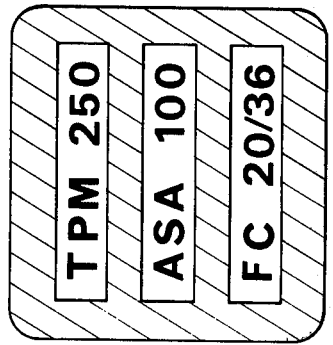
(b) 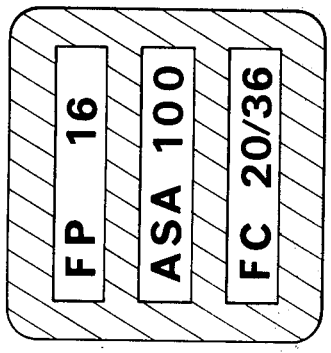
(c) 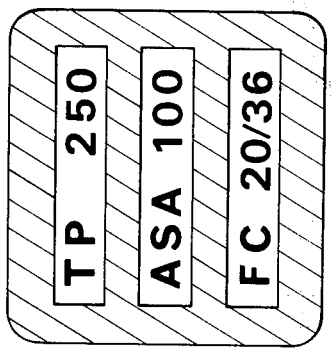
(d) 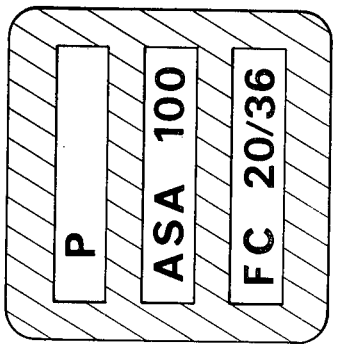
(e) 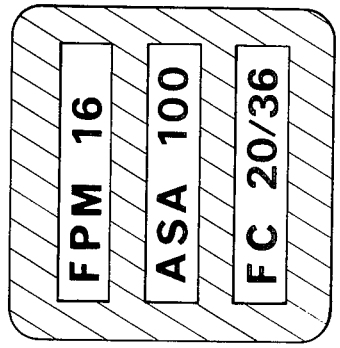

DIGITAL CAMERA

BACKGROUND OF THE INVENTION

1. Field of the Invention

This invention relates to a digital camera with dual-priority and program automatic exposure controls and, more particularly, to a system for providing the various display and setting conditions of such a camera in selective and/or corrective manner.

2. Description of the Prior Art

It is already known in the prior art to provide a camera equipped with a shutter preselection automatic diaphragm range and a diaphragm preselection automatic shutter range which are set in a selective manner by taking into account their respective advantages. The former exposure control is convenient in snapshot and sport photography where camera shake or the formation of blurred images of subjects of principal photographic interest has to be avoided. The latter enables the photographer to adjust, in advance, the depth of field which is quite important in portrait, close-up and copying photography. Since the exposure value is a function of scene brightness, there is a strong possibility for the light value to fall outside of the dynamic range of the diaphragm setting or the shutter timing control. If this occurs, the photographer must alter the preset value of shutter time or diaphragm aperture until a correct exposure value is derived. This necessary manipulation is somewhat time-consuming and, therefore, will sometimes result in missing a good shutter opportunity that will never again recur.

It is also known to provide a program camera in which shutter time and diaphragm aperture are automatically set mutually or alternately in accordance with a predetermined program. While this exposure control is capable of deriving exposure values over the entire range of photographic situations which may be encountered, skilled photographers cannot always apply their full knowledge of the influence of shutter times or diaphragm aperture to the quality of exposures.

An attempt has been made to solve the complementary problems of these two types of cameras by incorporating all of the aforementioned exposure controls in a single camera. In this case, however, a more stringent requirement is placed on the rapid access of setting not only a desired mode but also a preselected exposure factor. It is also necessary to set the sensitivity of the film used into the camera. As long as the manual settings are performed by analog means such as the shutter and film dials, diaphragm ring and mode selection control knob, the necessary manipulation of these setting means becomes very complicated. This is particularly so when the number of program schemes employed is not limited to a single program but is increased to contain shutter preselection and diaphragm preselection magic modes, and the photographer, therefore, will often be misled when two or more mode symbols are displayed at a time. It is desirable to shield not only all of the mode symbols available except for the current one, but also all of the graduations for the shutter time, diaphragm aperture and film speed scales except for the selected values. However, this calls for an increase in the complexity and size of the camera housing structure. What is even worse is that the decorative aspect of the camera, which is of great importance in the market of this kind of item, is adversely affected.

Accordingly, the present invention has, for a general object, the incorporation of the dual-priority and program automatic exposure modes in a common camera, while nevertheless eliminating all of the above-mentioned drawbacks.

An object of the present invention is to provide a camera having incorporated therein a mode selection device receptive of one of a number of setting members corresponding to the number of automatic exposure modes available from the outside of the camera housing and responsive to the information on the received setting member for providing outputs to control the shutter timing and diaphragm setting devices of the camera in accordance with the selected mode.

According to one embodiment of the invention, as is applied to a digital control system for the shutter timing and diaphragm setting devices, the mode selection device is constructed in the form of a logic circuit rendered responsive to information coded in binary form on the setting member.

Another object of the present invention is to provide a camera of the character described above with a single operating member for a number of display and setting conditions corresponding to the number of automatic exposure modes available.

To achieve these objects, the present invention incorporates the use of a counter in combination with a pulse generator which also serves to digitally display and set the values of shutter time, diaphragm aperture, film speed and film footage. When no setting member is present in the camera, actuation of the operating member or push button causes the counter to cooperate with the pulse generator so that all of the mode symbols are sequentially displayed. Upon release of the button, the current mode is set. When the setting member is supplied to the camera, the counter is no longer efffective to count the pulses from the generator but, instead, is rendered responsive to the information on the setting member.

Another object of the invention is to provide a digital camera of smart appearance with a number of controlling push buttons necessary to symbolically display all of the exposure factors on the upper panel of the camera housing as well as in the field of view of the finder and to select and/or correct the values of the exposure factors displayed. The push buttons are to be neatly arranged to reduce the possibility of erroneous manipulation.

Another object of the invention is to display the number of film frames available and the number of frames exposed and to sound an alarm when a few fresh frames are reached.

Another object of the invention is to utilize the sound alarming device in facilitating actuation and release of each of the set buttons. In this connection, a sound signal of short duration is heard each time the displayed discrete value advances one graduation.

In accordance with the invention, an automatic exposure control apparatus for a camera comprises light measuring means for producing an electrical signal proportional to the level of brightness of an object being photographed, exposure factor setting means for producing electrical signals proportional to preset values of exposure factors, and exposure value computing means responsive to the electrical signals from the light measuring and the factor setting means for producing an output. Also included are shutter control means, diaphragm control means and exposure mode selecting means responsive to first and second switch signals for directing the output of the computing means to either of the shutter control means and the diaphragm control means, respectively. Finally included are signal forming means having terminals receptive of one of a number of different mode setting members and upon reading of information on said mode setting member, for producing either of one of the first and second signals to be applied to the mode selecting means.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 2 is an exploded perspective view showing an arrangement of the various switches of a setting system in the exposure control apparatus of the camera of FIG. 1;

FIGS. 5(a) to 5(e) are plan views of an example of an arrangement of the various digital values displayed along with their respective function symbols headed, on the upper panel of the camera housing of FIG. 1, in five different operative positions for the shutter preselection automatic, diaphragm preselection automatic shutter preselection magic, diaphragm preselection magic and program modes, respectively.

DESCRIPTION OF THE PREFERRED EMBODIMENTS

Figure 1:
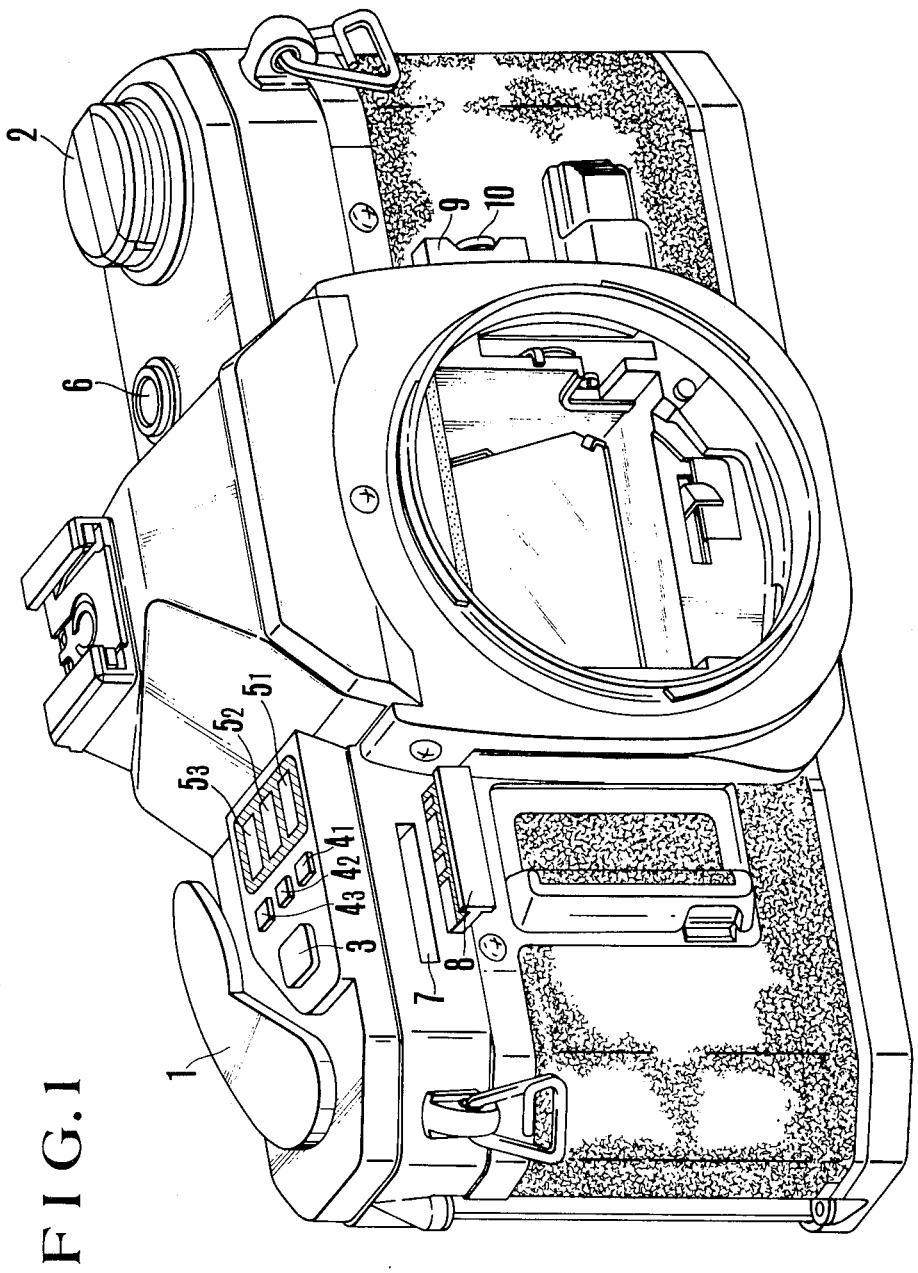
FIG. 1 is a perspective view showing the external appearance of one embodiment of a digital camera according to the present invention.

Referring to FIGS. 1 to 5, there is shown one embodiment of a digital camera according to the present invention with an interchangeable objective lens being omitted for illustration purposes. On the upper panel of the camera housing and between a film winding lever and a finder housing, there is shown a digital display window 5 composed of three sections $5_1$, $5_2$ and $5_3$. Adjacent these sections are positioned three controlling push buttons $4_1$, $4_2$ and $4_3$, respectively. A shutter release button is indicated at 3. In an upper right-hand portion of the front panel of the camera housing is formed a recess 7 having a rectangular opening shape to receive a mode setting member or card 8. This card 8 has six binary bits and a common bus which are to be read by respective sensing contacts $m_1$ to $m_7$ within the camera housing (FIGS. 2 and 3(a)). The first three of the bits give information representative selectively of five automatic exposure modes, namely, the shutter preselection automatic diaphragm range (hereinafter referred to as TP), the diaphragm preselection automatic shutter time range (FP), the shutter preselection magic program (TPM), the diaphragm preselection magic program (FPM) and the dual-range automatic program (P). When the card 8 is inserted into and seated in the recess 7, the symbol of the selected mode is displayed in the window $5_1$ as shown in FIG. 5. Without the use of any card 8, it is possible to set a desired mode into the camera by the first controlling push button $4_1$.

As the mode symbol displayed is cleared by supply of a battery into the camera to "TP", if the desired mode is different from "TP", the photographer needs to depress the first button so that all the symbols are sequentially displayed in the order shown in FIGS. 5(a) and 5(e), and this sequence repeats itself so long as the first button $4_1$ is depressed. As soon as the symbol of the desired mode appears, the photographer has to release the button. Thus, the desired mode is manually set into the camera. A safety button 6 is provided to prevent occurence of accidental correction of the display of the mode symbol, of a digital value of film speed, and of a possible maximum number of film frames by the second and third buttons $4_2$ and $4_3$, respectively. While depressing the safety button 6, the photographer may depress the second button $4_2$ to sequentially display the values of the film speed in discrete progression, beginning with "100" in ASA as the cleared state. As soon as the corresponding value to that of the used film appears at the window $5_2$, the photographer has to release either one of the buttons 6 and $4_2$. Such setting procedure applies similarly to the third button $4_3$ for continuous progressin of integer numbers from zero.

With "TP", or "TPM" selected, when the shutter time takes a value of 1/500 second causing a number "500" to be displayed to the right of the heading "TP" or "TPM", correction may be effected by first pushing a lock button 10 which also serves as an actuator for the same switch S5 (FIG. 2) of the safety button 6 and then actuating a slide knob 9 for upward or downward movement depending upon the setting of larger or smaller values, i.e., faster or slower, shutter time values, respectively. Just after the readout of the corresponding number to a value to be set appearing on the display 5, the photographer must rapidly release either the knob 9 or the button 10 to its initial inactive position. Next, upon change to "FP" or "FPM" mode, the shutter time display is blanked out and, instead, the diaphragm value which depends on the last readout in "TP" or "TPM" mode is displayed in an F-number as shown in FIGS. 5(b) and 5(d). If the photographer desires to change this value to a larger or smaller value, i.e., a smaller or larger size of the diaphragm aperture, he will first press the button 10 and then move the knob 9 upward or downward, respectively. In the "P" position, the shutter and diaphragm are controlled in accordance with a predetermined program, for example, at equal rates over the entire ranges of controls. Therefore, the digital display is maintained in a blanked-out condition.

FIG. 2 shows the basic moving parts within the camera housing of FIG. 1 associated with twelve switches S1 to S12. Of these, there are the switches S1, S2, S3, S4, S5 (S5') and S8 (S9) cooperative with the button $4_1$, knob 9, buttons $4_2$, $4_3$ and 6 (10) and shutter button 3, respectively. The switch S6 is arranged to be opened when an interchangeable lens is attached to the camera housing and when a diaphragm ring 101 is set with a symbol "AE" thereon in registry with a stationary index 102 so as to push a shaft 142 rearwardly at its forward end on a cam lobe 101b. The opposite end of the shaft 142 turns a lever 143 against the force of a spring 143a to open that switch S6 controlling operation of a camera function display within the finder 79 and 80 (FIG. 3(b)) and a mode setting counter 14 (FIG.

3(a)). Such movement of the lever 143 also causes clockwise movement of an intermediate lever 170 against the bias of a spring 170a which, in turn, causes counterclockwise movement of a locking lever 171 against the bias of a spring 171a. A diaphragm setting scanning is thereby rendered operative with an electromagnetic actuator Mg1. The operational mechanical mounting for the objective lens is further provided with a pin 153 having a length related to the maximum possible size of diaphragm aperture (Avo) and is arranged so that an Avo-set lever 154 is turned in a counterclockwise direction with the resultant positions of its four sliders, $n_1$ to $n_4$, on a binary coded signal forming plate 168, depending upon the minimum F-number.

After the aforesaid setting operation has been performed, the photographer will turn to shortly depress the shutter button 3 while looking through the finder. At this time, a conductive rod of the shutter button 3 touches a movable contact 166 so that the switch S8 is closed. Assuming that the "TP" mode is set and that the computed exposure value is out of the dynamic range of diaphragm setting control, then either of the upward and downward pointed arrows in a left-hand bottom corner of the viewfield of the finder is caused to glow, informing the photographer of the necessity of alteration of the preselected shutter time value. Therefore, he must manipulate the knob 9 and button 10 until the glowing of the arrow ceases.

Upon further depression of the shutter button 3, the movable contact 166 is brought into electrical connection with a fixed contact 167. The switch S9 is thereby closed to instantaneously energize a second electromagnetic Mg2 as a camera release actuator. As the magnet flux of a permanent magnet piece is cancelled, an armature 113a is moved away from the magnet Mg1 with a first latching lever 113 which is turned clockwise by the action of a spring 113c. Motion of the lever 113 is transmitted through a pin 113b to an intermediate lever 114 and then to three levers 115, 116 and 150.

Counterclockwise movement of the second latching lever 116 actuates the diaphragm setting scanning mechanism. A diaphragm presetting ring 103 is biased by a spring 103a and has a rearwardly extending arm 103c borne by a swing lever 129 which is suspended by a lever 128 and which is connected to a sector gear 118 through a rod 118d. When the second latching lever 116 is disengaged from the sector gear 118, the latter is driven by the spring 103 which overcomes a spring 118c so as to rotate about a shaft 118a. This causes a slider 118b to scan a comb-toothed electrical conductance track 161 with successive production of pulses. The speed of rotation of the sector gear 118 is regulated by a governor 119. When the number of pulses produced has reached a level dependent upon the preselected value of the diaphragm aperture or the computed exposure value, the first magnetic winding Mg1 is de-energized, causing an arresting lever 130 to engage with one of the teeth of a star gear 119c under the action of a spring 131a. Thus, the deflected position of the diaphragm presetting ring 103 is translated to the proper diaphragm aperture through a forwardly extending arm 103d which acts on a diaphragm blade control mechanism (not shown) when a diaphragm closing down member 104 is operated by a lever 105 in synchronism with upward movement of a mirror 138. The latter is driven by a lever 111 through a return control lever 136 on a mirror control lever 137.

When the mirror drive lever 111 nears the terminal end of movement, a front curtain (not shown) latching lever 133 is disengaged from a pin on a master gear 134 which meshes with a pinion 135 on a wind-off drum shaft (not shown). At this time, a shutter timing start switch S10 is opened. At the termination of a time interval dependent upon the preselected value of shutter time or the computed exposure value, a third magnetic winding Mg3 is energized to cancel out the magnetic flux of a permanent magnet piece associated therewith, causing a rear curtain latch lever 140 to disengage from a pin 139a on a master gear 139 under the action of a spring 140b. Soon after the start of rotation of the gear 139, and downwardly extending pin 139b is moved away from the switch S7. Thus, the footage counter advances one frame.

After the exposure has been completed, the pin 139a strikes a lever 141 at its tail, the head of which is acted on the mirror return control lever 136. The mirror 138 is thus returned to its viewing position and the diaphragm blades are reset to the full open position. When the film winding lever 1 (FIG. 1) is cocked, a drive shaft 108 turns in a counterclockwise direction indicated by an arrow, while driving a reset mechanism. This mechanism includes a cam disc 109 fixedly secured to the shaft 108, a cam follower 110a on one arm of a lever 110, the opposite end of which has a pin 110b arranged upon cocking to turn an intermediate lever 107 in a counterclockwise direction and also the mirror drive lever 111 in a clockwise direction. The mechanism also includes an escapement lever 112 arranged to transmit motion of the lever 107 both to the sector gear 118 through intermediary 120, 121 and 127 and to the arresting lever 130. Counterclockwise movement of the lever 110 also causes the first latching lever 113 to move the armature 113a into the range of attraction of the permanent magnet piece against the force of a spring 113c, while permitting the levers 114 and 150 to return to their initial positions by the action of springs 114g and 150a. Thus, all of the mechanism is reset to the cocked position.

When a remaining number of fresh frames has reached six, an actuating signal is applied to a buzzer 155 on the back cover of the camera housing through a contact member 156 which is mounted on the stationary part of the camera housing. After six more frames have been exposed, the photographer will rewind the film and then open the back cover to remove the film. The switch S12 is thereby actuated so as to open for allowing automatic resetting of the film footage function display to zero in both readings.

Figure 3A:
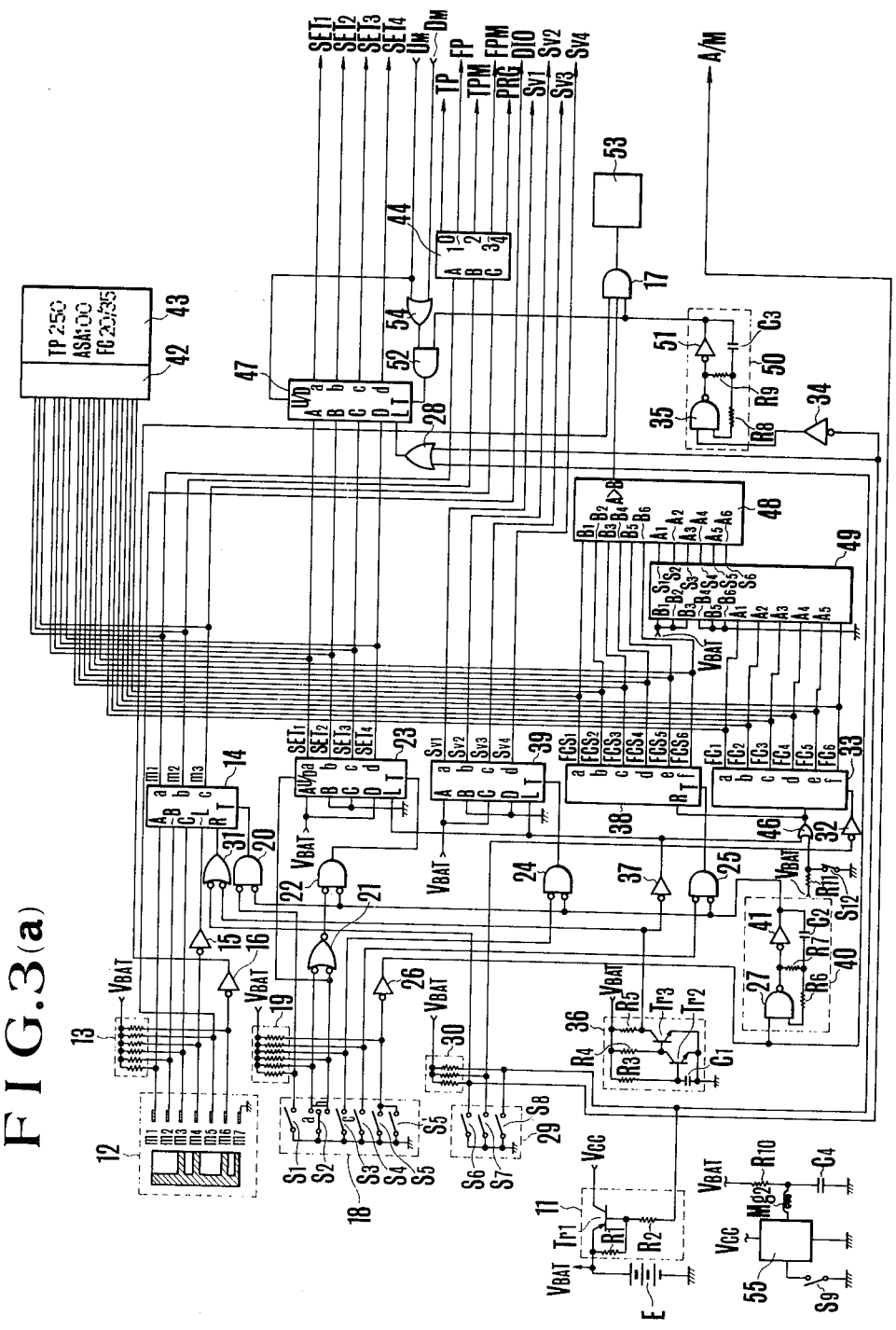
FIGS. 3(a) and 3(b) together comprise a schematic electrical circuit diagram of a digital control system in the camera of FIGS. 1 and 2, with FIG. 3(a) being the left-hand portion of the circuit and FIG. 3(b) being the corresponding right-hand portion of the circuit.
Figure 3B:
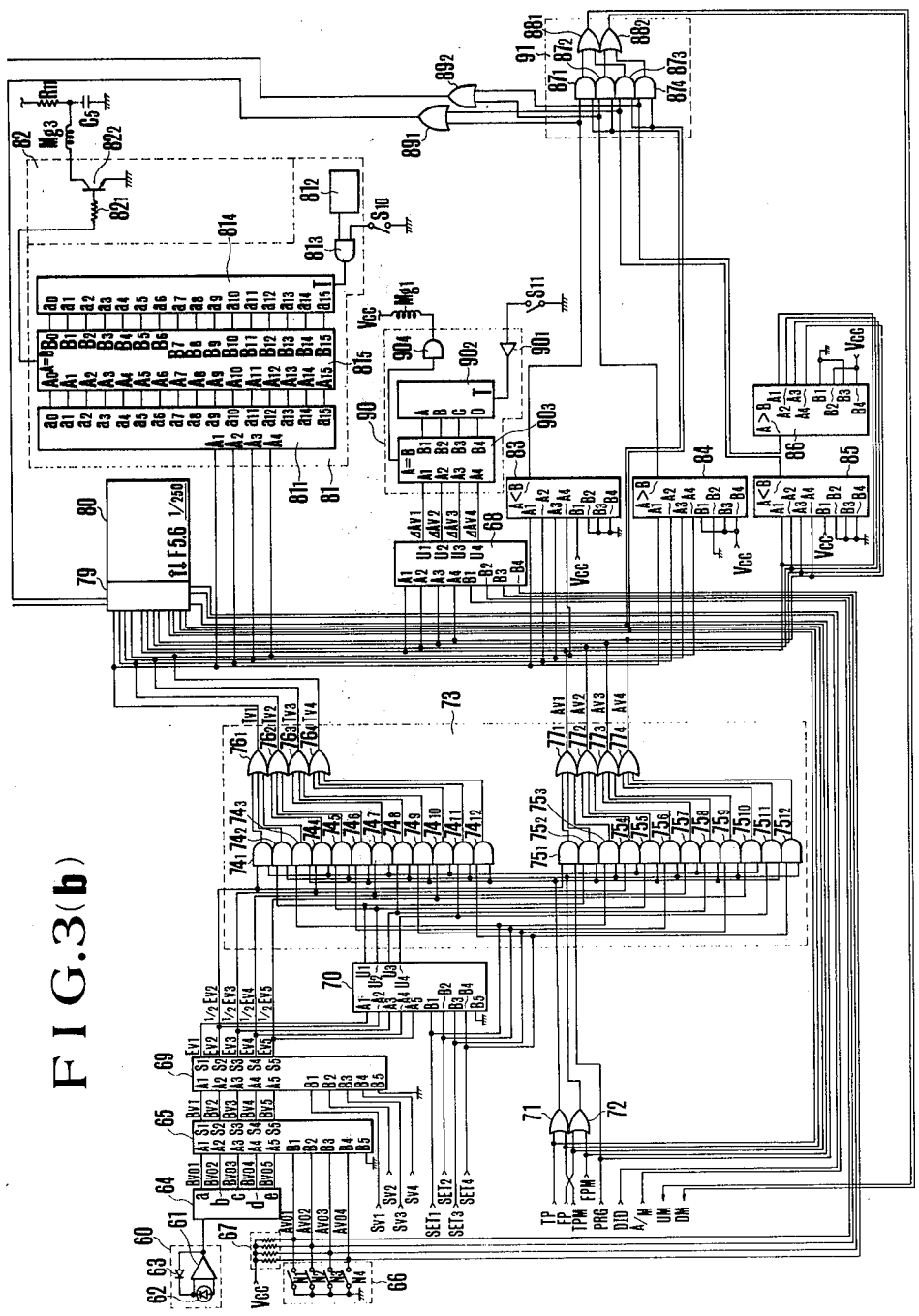
Figure 4:
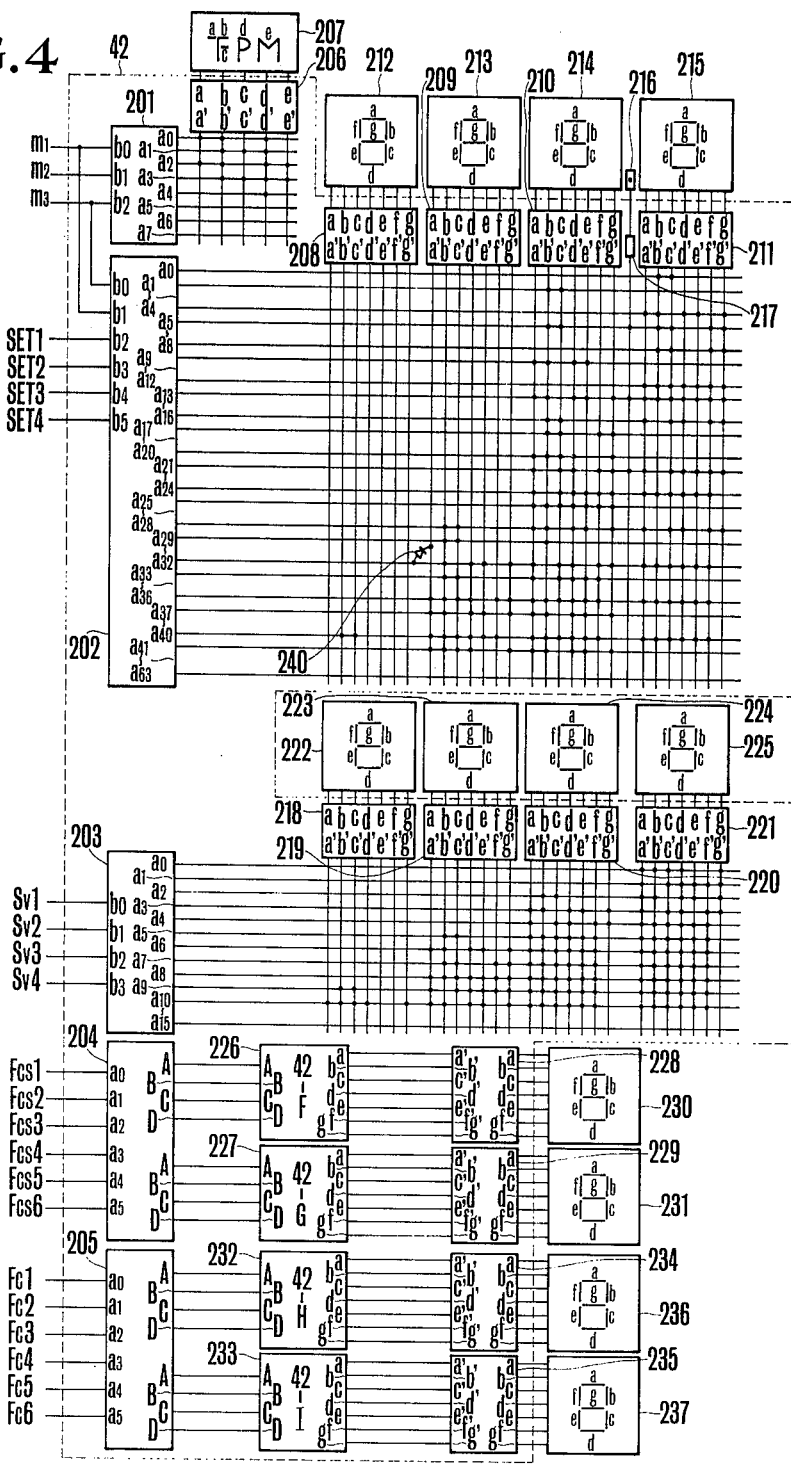
FIG. 4 is a schematic electrical circuit diagram showing the details of the digital display of FIG. 3.

FIGS. 3(a), 3(b) and 4 show a circuit diagram of logic circuitry of the camera of FIGS. 1 and 2. An electrical power supply source or battery E, when loaded in a chamber within the camera housing below the card receptacle 7, gives the most positive voltage $V_{BAT}$ (logic one) to a camera function setting system mainly shown in FIG. 3(a) and is grounded at the negative terminal thereof. Thus, positive logic is employed throughout. A constant voltage Vcc from a circuit 11 is supplied to an exposure control circuit of FIG. 3(b).

Circuit 11 includes a transistor Tr1 with its emitter connected to the terminal $V_{BAT}$ and with its collector connected to a terminal Vcc, a first resistor R1 connected between the emitter and base of the transistor Tr1, and a second resistor R2 connected between the base of the transistor Tr1 and the first shutter button switch S8.

A card reader 12 includes seven sensing contacts, $m_1$ to $m_7$, arranged in the receptacle 7 to read the binary words on the card 8 seated therein as they vary according to the different cards 8 which are five in number. While the 7th contact is grounded, the other contacts, $m_1$ to $m_6$, are connected to respective pull-up resistors in a first switch signal generator 13 cooperative with the voltage $V_{BAT}=1$. A truth table for the five mode setting states corresponding to the valid combinations of outputs of m1, m2 and m3 is given below.

TABLE 1

| m1 | m2 | m3 | Mode Display State | Remark |
|---|---|---|---|---|
| 0 | 0 | 0 | TP | Shutter preselection automatic diaphragm range |
| 1 | 0 | 0 | FP | Diaphragm preselection automatic shutter range |
| 0 | 1 | 0 | TPM | Shutter preselection magic program |
| 1 | 1 | 0 | FPM | Diaphragm preselection magic program |
| 0 | 0 | 1 | P | Dual-range program |

A mode set ring counter 14 has three preset inputs A, B and C connected to the signal generator 13 at m1, m2 and m3, respectively, and has a latch input L connected through an inverter 15 to a signal output m4 which takes on the most negative voltage of logic zero only when any card 8 is presented. A signal $m5=0$ appears only when the "P" mode setting card 8 is employed and is applied on a line D10 to establish no display of the exposure function in the viewfield of the finder 80 (FIG. 3(b)). All the five cards 8 have an order to be given at m6 to cause production of a sound warning by the buzzer 155 (FIG. 2) when the condition of only six fresh frames remaining has been reached, as the signal m6 is applied through an inverter 16 and an AND gate 17 to a control circuit 53 for the buzzer 155.

A setting control logic further includes a second switch signal generator 19 in the form of a pull-up resistor group associated with the manual MODE-DIGIT switch arrangement 18. A signal S1 is applied to a first input of a NOR gate 20 having a second input connected to an output of an oscillator 40. The output of NOR gate 20 is connected to a timing pulse input T of the ring counter 14. Signals S2a and S2c are applied to respective inputs of an AND gate 21 having an output connected to a first input of a NOR gate 22, a second input of the NOR gate 22 being connected to the oscillator 40. The output of the NOR gate 22 is connected to a timing pulse input T of a ring counter 23 for selecting or correcting an initially set value of preselected exposure factor, i.e., shutter time or diaphragm aperture. Since the counter 23 has inputs $A=1$, $B=0$, $C=0$ and $D=1$, when a power-up clear circuit 36 is actuated to produce an output "0", which after having been inverted by an inverter 37 is applied to a latch input L of the counter 23, the output stages a, b, c and d, of the counter 23 is in the initial setting (1001) state corresponding to either 1/500 second in shutter time, or F/22 in diaphragm aperture.

Since the signal S2c is applied to an UP-DOWN control input U/D of the counter 23, it functions as an UP or DOWN counter dependent upon which logic level takes place, "1" or "0", respectively. Upon upward movement of the knob 9 (FIG. 1) followed by depressin of the button 10, signal $S2a=0$ causes AND gate 21 to produce "0" output which actuates NOR gate 22 so that a pulse train from the S5-actuated oscillator 40 is passed therethrough to the timing input T of counter 23. In the UP mode, upon advent of a first pulse, counter 23 advances one count so that a one-step larger number, i.e., 1000 or 32, is displayed on the window $5_1$ with the setting of 1/1000 second in shutter time, or F/32 in diaphragm aperture, respectively. After six more pulses have been counted, counter 23 reverts to the maximum, i.e., longest shutter time or largest diaphragm aperture setting state. As long as the knob 9 and button 10 are left unchanged in position, successive cycles of eleven setting states occur, as shown in the following truth table for the FACTOR setting states corresponding to the valid combinations of binary conditions of the output stages a, b, c and d.

TABLE 2

| Setting State in Counter | | | | Equivalent Decimal No. in Tv or Av | Actual Shutter Time in Sec. | Actual Diaphragm Value in F-Number |
|---|---|---|---|---|---|---|
| a | b | c | d | | | |
| 0 | 0 | 0 | 0 | 0 | 1 | 1.0 |
| 1 | 0 | 0 | 0 | 1 | 1/2 | 1.4 |
| 0 | 1 | 0 | 0 | 2 | 1/4 | 2.0 |
| 1 | 1 | 0 | 0 | 3 | 1/8 | 2.8 |
| 0 | 0 | 1 | 0 | 4 | 1/15 | 4.0 |
| 1 | 0 | 1 | 0 | 5 | 1/30 | 5.6 |
| 0 | 1 | 1 | 0 | 6 | 1/60 | 8.0 |
| 1 | 1 | 1 | 0 | 7 | 1/125 | 11.0 |
| 0 | 0 | 0 | 1 | 8 | 1/250 | 16.0 |
| 1 | 0 | 0 | 1 | 9 | 1/500 | 22.0 |
| 0 | 1 | 0 | 1 | 10 | 1/1000 | 32.0 |

A switch signal S3 goes to a NOR gate 24 for passing the pulse train from the oscillator 40 therethrough to a timing input T of a film speed-set ring counter 39. Since preset inputs $A=1$, $B=0$, $C=1$ and $D=0$, the outputs a, b, c and d of counter 39 are in the initial setting (1010) state corresponding to a film speed value of 100 in ASA. A truth table is given below:

TABLE 3

| Setting State in Counter 39 | | | | Equivalent Decimal No. in Sv | Actual Film Speed in ASA | Setting State in Counter 39 | | | | Sv | ASA |
|---|---|---|---|---|---|---|---|---|---|---|---|
| a | b | c | d | | | a | b | c | d | | |
| 0 | 0 | 0 | 0 | 0 | 3 | 0 | 1 | 1 | 0 | 6 | 200 |
| 1 | 0 | 0 | 0 | 1 | 6 | 1 | 1 | 1 | 0 | 7 | 400 |
| 0 | 1 | 0 | 0 | 2 | 12 | 0 | 0 | 0 | 1 | 8 | 800 |
| 1 | 1 | 0 | 0 | 3 | 25 | 1 | 0 | 0 | 1 | 9 | 1600 |
| 0 | 0 | 1 | 0 | 4 | 50 | 0 | 1 | 0 | 1 | 10 | 3200 |
| 1 | 0 | 1 | 0 | 5 | 100 | | | | | | |

A switch signal S4 goes to a NOR gate 25 at a first input thereof upon advent of a switch signal S5 at the oscillator 40 to pass the pulse train therethrough to a timing input T of a ring counter 38 for setting the capacity of the used film, i.e., the maximum possible number of frames. Counter 38 has six output stages a to f for 63 setting states.

A footage-set ring counter 33 has a "set" input connected through an inverter to a third switch signal generator 30 with the arrangement of the switches S6 to S8 at 29, and has a "reset" input connected through a common OR gate 46 of counter 38 to a point of connection between a resistor R11 and the switch S12, the opposite input of the OR gate 46 being connected through an inverter 37 to the output of the power-up clear circuit 36.

The power-up clear circuit 36 includes a resistor R3, a capacitor C1 connected in series to the resistor R3, a transistor Tr2 with its base connected to the junction point between the resistor R3 and capacitor C1, with its emitter grounded, and with its collector connected through a resistor R4 to $V_{BAT}$, and a second transistor Tr3 with its base connected to the collector of the transistor Tr2, with its emitter grounded, and with its collector connected to $V_{BAT}$ through a resistor R5 and also to the AND gate 31 and inverter 37.

The oscillator 40 includes a NAND gate 27 having two inputs, one of which is connected through an inverter 26 to a point of connection between the switch S5 (S5') and the resistor element 19, and another input which is connected through series-connected resistors R6 and R7 to an output of itself, an inverter 41 having an input connected to the output of NAND gate 27, and a capacitor C2 connected between the output of the inverter 41 and a point of connection between the resistors R6 and R7. The output of the inverter 41 is connected to all the NOR gates 20, 22, 24 and 25 at one of their inputs.

Another oscillator 50 of the same construction as that of the first oscillator 40 contains a NAND gate 35, resistors R8 and R9, a capacitor C3 and inverter 51, and has an input stage connected through an inverter 34 to the output S8 of the signal generator 30, and an output stage connected to a second input of the AND gate 17. A third input of the AND gate 17 is connected to an output of a magnitude comparator 48 having two sets of inputs A and B thereof. The first set of inputs A1 to A6 are connected to respective outputs S1 to S6 of an adder 49, while the second set of inputs B1 to B6 is connected to the outputs FCS1 to FCS6 of the film capacity-set ring counter 38. The outputs FC1 to FC6 of the footage counter 33 are connected to respective inputs A1 to A6 of the adder 49 which adds seven to the number of frames counted by the counter 33, since the inputs B1 to B6 are in a presetting state (111000). When the number of pulses counted by the counter 33 at the time of completion of each exposure plus seven exceeds the number set in counter 38, the magnitude comparator 48 changes its output from "0" to "1". With no more than six fresh frames available, therefore, when the photographer depresses the shutter button 3 to the first stroke, the second oscillator 50 is rendered operative to produce a pulse train which is permitted to pass through the AND gate 17 to the buzzer control circuit 53, provided that the card 8 is loaded in the reader 12.

By reference to FIG. 4, MODE-SET ring counter 14 produces control signals m1, m2 and m3 which are supplied to a decoder 201 acting as a control circuit for a three-alphabetical character display 207 along with a matrix of diodes (indicated at 240 taking, for example) and a five-segment driver 206. The first character readout device is formed by three display segments a, b and c which are arranged to selectively represent "T" and "F" by exciting the first two segments a and b, and by the segments b and c, respectively. The fourth and fifth segments d and e are configured to the alphabetical characters "P" and "M", respectively. Thus, the mode symbols "TP", "FP", "TPM", "FPM" and "P" can be displayed in a selective manner by selective combination of excitation of individual segments a to e, as is effected by character-control signals (not shown).

The outputs a to d of FACTOR-SET counter 23 produce control signals SET1 to SET4 which are supplied to the last four inputs b2 to b5 of a decoder 202 acting as a control circuit for a four-digit and one-decimal point display of stations 212 to 216 along with a matrix of diodes and four 7-segment drivers 208 to 211 with a point segment driver 217 to display a digital value of shutter time or diaphragm aperture dependent upon the logic values of control signals m1 and m3 applied to the first two inputs b0 and b1 of the decoder 202. Each 7-segment display station can represent the digits 0 to 9 by selective excitation of individual segments, a to f.

The outputs, a to d, of FILM SPEED-SET counter 39 produce control signals Sv1 to Sv4 which are decoded by a decoder 203 to control four segment drivers 218 to 221 for a four-digit display through a diode matrix. The FILM CAPACITY and FOOTAGE counters 33 and 38 are connected through respective multiplex circuits 205 and 204 to a pair of decoders 232 and 233 and a pair of decoders 226 and 227, respectively. The film function data thus decoded are represented by four-digit displays 237 to 230.

Referring to FIG. 3(b), there is shown a light measuring circuit 60 including an operational amplifier 61 having two inputs across which is connected a light sensitive element 62, and a feedback diode 63 connected between one of the inputs and an output of the operational amplifier 61. The output of the circuit 60 is applied to an analog-to-digital converter 64 having five output stages, a to e, connected to inputs A1 to A5 of an adder 55 which has also four inputs B1 to B4 connected to respective outputs of a signal generator composed of the maximum possible diaphragm value setting switch arrangement 66 (corresponding to 158 in FIG. 2) and a pull-up resistor group 67. The adder 65 have five output stages S1 to S5 connected to five inputs A1 to A5 of a second adder 69 which has also four inputs; B1 to B4 to receive the control signals Sv1 to Sv4 of FIG. 3(a), an additional input B5 of the adder 69 being grounded. Five outputs S1 to S5 of adder 69 provide two sets of control signals Ev1 to Ev5 in the first set, and ($\frac{1}{2}$) Ev2 to ($\frac{1}{2}$) Ev5 in the second set, the latter being directly applied to a program selection logic 73. A subtracter 70 has a first five inputs A1 to A5 connected to the outputs S1 to S5 of second adder 69. An additional five inputs B1 to B5 of subtracter 70, one of which B5 is grounded, are supplied with the outputs SET1 to SET4 of counter 23 through a shift register 47 (FIG. 3(a)). Outputs U1 to U4 of subtracter 70 constitute information representative of a computed exposure value for use in all of the exposure modes except the "P" mode where the first set of outputs ($\frac{1}{2}$) Ev2 to ($\frac{1}{2}$) Ev5 of second adder 69 are used in place of the outputs U1 to U4 and SET1 to SET4.

Turning again to FIG. 3(a), the outputs m1 to m3 of MODE-SET counter 14 are connected to inputs A to C of a binary coded decimal counter 44 having five outputs 0 to 4 thereof which produce switch signals TP, FP, TPM, FPM and PRG, respectively, for the selection logic 73 (FIG. 3(b)) with an OR gate 71 having two inputs supplied by TP and TPM and another OR gate 73 having two inputs supplied by FP and FPM.

The outputs SET1 to SET4 of FACTOR-SET counter 23 are connected to inputs A to D of an UP-DOWN counter 47 which functions to shift the preset value of exposure factor in response to manual actuation of the button 6 (FIG. 2), as the computed exposure value (U1 to U4) is out of the dynamic range of the shutter or diaphragm control. For this purpose, a latch input L of counter 47 is connected to an output of an OR gate 28 having two inputs connected to the switches S6 and S8, while a timing input T is connected to an output of an AND gate 52 which is enabled by an output of an OR gate 54 to pass the pulse train from the oscillator 50 therethrough. An input UM of the OR gate 54 is connected to an U/D input of counter 47, another input of OR gate 54 being DM.

In FIG. 3(b), the selection logic 73 is shown as being composed of two gating circuits. The first circuit includes twelve AND gates $74_1$ to $74_{12}$ with their outputs grouped in three's to enter respective OR gates $76_1$ to $76_4$ which provide a set of shutter control signals Tv1 to Tv4. The second gating circuit includes twelve AND gates $75_1$ to $75_{12}$ with their outputs grouped in three's to enter respective common OR gates $77_1$ to $77_4$ which provide a set of diaphragm control signals Av1 to Av4. Switch signal PRG is applied to gating control inputs of all of the first AND gates in each group, that is, the AND gates $74_1$, $74_4$, $74_7$, $74_{10}$, $75_1$, $75_4$, $75_7$ and $75_{10}$ which also have other inputs connected to the outputs S2 to S5 of the second adder 69. Switch signal TP or TPM is applied through the OR gate 71 to all of the third AND gate $74_3$, $74_6$, $74_9$ and $74_{12}$ at their gating control inputs. The opposite inputs of these AND gates are connected to the outputs SET1 to SET4 of shift register 47, and to all of the second AND gates $75_2$, $75_5$, $75_8$ and $75_{11}$ at their gating control inputs. The opposite inputs of these AND gates are connected to the outputs U1 to U4 of the subtracter 70. Switch signal FP or FPM is applied through the OR gate 72 to all of the second AND gate $74_2$, $74_5$, $74_8$ and $74_{11}$ in the first circuit at their gating control inputs. The opposite inputs of these AND gates are connected to the outputs U1 to U4 of the subtracter 70 and to all of the third AND gate $75_3$, $75_6$, $75_9$ and $75_{11}$ in the second circuit at their gating control inputs. The opposite inputs of these AND gates are connected to the outputs SET1 to SET4 of the shift register 47.

A shutter timing control circuit includes a decade counter $81_1$ having four inputs A1 to A4 connected to the outputs Tv1 to Tv4 of logic 73, a clock pulse generator $81_2$, an AND gate $81_3$ which is enabled by the switch S10 to pass a clock pluse train from $81_2$ to a timing input T of a counter $81_4$, and a magnitude comparator $81_5$ interposed between the decade counter $81_1$ and counter $81_4$ and capable, upon coincidence of the contents of the counters 81 and $81_4$, of producing an actuating signal which is applied to a switching circuit 82 for the magnetic winding Mg3 (FIG. 2). Accordingly, when transistor $82_2$ conducts, the magnetic winding Mg3 is energized in the form of impulse with power supplied from a capacitor C5 which is previously charged through a resistor R11.

To detect when the computed exposure value exceeds the upper limit or drops below the lower limit of the given shutter range, in this instance, ½ second and 1/2000 second, respectively, there are provided maximum and minimum range comparators 83 and 84. Each of these comparators has four inputs A1 to A4 connected to the output Tv1 to Tv4 of the logic 73, while the other inputs B1 to B4 of comparators 83 and 84 are in the states (1000) and (1011), respectively. The outputs of comparators 83 and 84 are supplied to a display control circuit 79 through respective OR gates $89_1$ and $89_2$ and to inputs of AND gates $87_1$ and $87_2$ which have also gating control inputs supplied with switch signal FPM. The outputs of AND gates $87_1$ and $87_2$ go through respective OR gates $88_1$ and $88_2$ to function as switch signals DM and UM for the AND gate 52 and UP-DOWN counter 47.

The outputs Av1 to Av4 of the logic 73 are supplied to a subtracter 68, maximum range magnitude comparator 85, minimum range magnitude comparator 86, all at their inputs A1 to A4, and the display control circuit 79. Inputs B1 to B4 of the subtracter 68 are connected to the outputs Avo1 to Avo4 of the generator 67, causing information representative of the difference between the full open aperture and the proper one to appear at outputs U1 to U4 thereof.

A diaphragm setting control circuit 90 includes an inverter $90_1$ connected between the pulse forming switch S11 (FIG. 2) and an input T of a counter $90_2$, a magnitude comparator $90_3$ interposed between the subtracter 68 and counter $90_2$ and a buffer gate $90_4$ through which the output of comparator $90_3$ is applied to the magnetic winding Mg1 (FIG. 2).

The maximum and minimum range magnitude comparators 85 and 86 have opposite inputs B1 to B4 preset in the states (1000) and (0101) corresponding to F/1.4 and F/32, respectively. The outputs of comparators 85 and 86 are supplied to the display control circuit 79 through the OR gates $89_1$ and $89_2$ and to inputs of AND gates $87_3$ and $87_4$ which are enabled by the switch signal TPM to effect automatic shifting operation of UP-DOWN counter 47 until the output of AND gate $87_3$ or $87_4$, which after having passed through the OR gate $88_1$ or $88_2$ functions as switch signal DM or UM, respectively, changes to a logic level "0".

OPERATION

The digital camera of FIG. 1, when supplied with a battery E in the chamber under the card receptacle 7, assumes an initial operative position where the settings of "TP" mode, 1/500 second in shutter speed, ASA 100 and zero in film function readings automatically take place without the use of any card 8, as the positive potential $V_{BAT}$ is applied to the various portions of the logic circuitry, causing at first the power-up clear circuit 36 to change its output to "0" in a short time interval. Responsive to this pulse of the clear circuit 36, the NAND gate 31 changes its output of "1" at which MODE-SET counter 14 is reset to the state (000), and the inverter 37 produces a "1" output which is applied to the inputs L of FACTOR-SET counters 23 and 39, thereby counters 23 and 39 are reset to the states (1001) and (1010), respectively. At the same time, FILM FUNCTION-SET counters 38 and 33 are also reset to zero.

Since the outputs m1, m2 and m3 of counter 14 in the initial setting state have (000), the shutter preselection automatic diaphragm range is rendered effective. Again, since the content of counter 23 is (1001), the preset value of shutter time in TV is 9, which is equivalent to 1/500 second. Further, the outputs m1, m2 and m3 of counter 14 are decoded by the decoder 201, causing a "1" output to appear at $a_0$ thereof. This output is distributed by the diode matrix to inputs a', b' and d' of the five-segment driver 207 so that the segments, a, b and d, are excited to preset the display of "TP" which can be seen through the window $5_1$ as shown in FIG. 5(a). On the other hand, the first and third outputs m1 and m3 of counter 14 and the outputs SET1 to SET4 of counter 23 are decoded by the decoder 202. Because of their being (001001) at inputs b0 to b5, decoder 202 produces a "1" output at its outlet a36, which is distributed to inputs a, c, d, f and g of the second 7-segment driver 209 and further to inputs a to f of the third and fourth drivers 210 and 211, with the resulting display of "500" being presented in the second, third and fourth stations 213, 214 and 215. The above discussion applies to the display of "100" with the heading of a printed symbol "ASA" which can be seen through the window 5$_2$. Since the counters 38 and 33 are empty, all of the outputs FCS1 to FCS6 and FC1 to FC6 are at a "0" level so that the display stations 230 and 236 present the digits "0".

(1) Automatic Setting of the Shutter Preselection Mode

When a "TP" setting card 8$_1$ is inserted into the receptacle 7, information encoded in binary form (000010) is read by the sensing contacts m1 to m6 of the card reader 12. The fourth contact m4 takes a logic "0" potential which, after having changed to a switch signal of logic "1" value by the inverter 15, goes to MODE-SET counter 14 at the latch input L, thereby the counter 14 is rendered receptive of the MODE information from the reader 12 at the inputs A, B and C, but not of the pulse train at the trigger input T. Thus, any intentional manual or accidental correction of the setting of "TP" mode is prevented from occurring. The fifth contact m5 produces a D10 switch signal which is directed to the finder display control circuit 79. The value of preselected shutter time is thereby displayed along with a computed exposure value, i.e., diaphragm value, with or without an out-of-range warning light signal. A switch signal of "0" value at m6 is inverted by inverter 16 and then applied to AND gate 17. The sound warning signal generator 53 is thereby rendered responsive to the outputs of the magnitude comparator 48 and oscillator 50.

Because the contacts m1, m2 and m3 have "0" potentials, the initial setting state of the counter 14 remains unchanged. The outputs a, b and c of the counter 14 are decoded by the binary-code decimal counter 44 to produce a switch signal "TP" of a logic "1" value from the output stage 0, the other output stages 1 to 4 producing signals of a logic "0" value which have no effect on the gating-on operation of the program selection logic 73.

Next, the photographer will turn to select or correct the initially set value of film speed, that is, ASA 100, depending upon the sensitivity of the used film. While depressing the safety button 6 and then holding it in, the photographer may actuate ASA setting button 4$_2$ to close the switch S3. This enables the NOR gate 24, causing the counter 39 to advance one count each time one pulse recurs at the oscillator 40. Thus, the counter 39 goes from ASA 100 through 200, 400, 800 and 1600 to 3200, followed by a return to ASA 3 as will be understood from Table 3. Then, it reverts to a cycle of eleven setting states, so long as the buttons 6 and 4$_2$ are held in simultaneously. Therefore, when the display 5$_2$ has advanced to the desired setting, the photographer has to release either one of the buttons 6 and 4$_2$. As a result, either no additional pulse is produced from the oscillator 40, or the NOR gate 24 is blocked by a "1" switch signal.

To set the maximum possible number of film frames in the counter 38, the photographer needs to depress the safety and set buttons 6 and 4$_3$ until the display of that number appears at the digit display stations 230 and 231, which can be seen through the window 5$_3$. Since the switches S5 and S4 are closed, a pulse train from the oscillator 40 goes through the enabled NOR gate 25 to arrive at the trigger input T of the counter 38. When the number of pulses counted has put the film capacity display in a "36" setting state, for example, either one of the buttons 6 and 4$_3$ must be released either to stop production of more pulses, or to effect gating-off of the NOR gate 25 by a "1" signal at one of its two inputs. During this operation, the outputs FCS1 to FCS6 of the counter 38 are decoded in sequence by the decoders 204, 226 and 227 to actuate the drivers 228 and 229 for the digit displays 230 and 231.

The initially set value of shutter time either may be selected or corrected, as desired, or must be adjusted so as to bring about the derivation of a correct exposure value. In correcting the shutter time of 1/500 second, the photographer will first depress the preparation button 10 and then move the knob 9 either upward or downward while the button 10 is being held in. Thus, the closure of the switch S5' is followed by movement of the switch S2 to the "a" or "c" position, respectively. The closure of the switch S5' then causes the oscillator to produce a pulse train and also causes the inverter 26 output to be supplied through the OR gate 28 to the input L of the shift register 47. With the switch S2 set in a "a" position, a "1" switch signal is applied to the U/P input of counter 23 so that the counter 23 works as an UP counter. Since one of the two inputs of the AND gate 21 is put in connection with the circuit ground, the output of AND gate 21 changes to "0", at which the NOR gate 22 is enabled to pass the pulse train to the counter 23. Alternatively, when the switch S2 is set in the "b" position, the counter 23 is made to work as a DOWN counter which, upon response to a first pulse, advances one count backward from the initial setting state of 1/500 second to a state of 1/250 second. In synchronism with the presentation of the number "250" in the digit display stations 213, 214 and 215, the photographer who desired the setting of 1/250 second has to release the preparation button 10. It is, of course, otherwise possible to effect the same result by putting the counter 23 in the upward counting condition. In this case, the counter 23 goes from the initial setting state to a forwardly advance state of 1/1000 and then returns to the first state of 1 second, and then reverts to a cycle of eleven setting states in sequence so long as the knob 9 and button 10 remain unchanged in position. The photographer needs to release the button 10 when the display of "250" is presented.

When the shutter button 3 is depressed to a first stroke and then held in this state, the switch S8 is closed, causing the constant voltage source 11 to apply a potential Vcc to the exposure control circuit. The metering circuit 60 produces an output voltage proportional to the logarithm of the level of brightness of an object to be photographed. This output is converted to a digital output by the A-D converter 64. The output signals Bvo1 to Bvo5 of the A-D converter 64 are compensated by the signals Avo1 to Avo4 of the switches N1 to N4 in the adder 65. The output signals Av1 to Av5 of the adder 65 are combined with the signals Sv1 to Sv4 of the counter 39 in the second adder 69 to produce output signals Ev1 to Ev5. The output signals Ev1 to Ev5 are then subtracted by the output signals SET1 to SET4 in the subtracter 70 to produce output signals Av1 to Av4 representative of an effective diaphragm value as a computed exposure value.

Responsive to the switch signal TP from the OR gate 71, the program selection logic 73 establishes a "TP" mode for the signals SET1 to SET4 and Av1 to Av4, the latter being the outputs of the subtracter 70. Since the AND gates 74$_3$, 74$_6$, 74$_9$ and 74$_{12}$ are gated on, the signals SET1 to SET4 are directed to the OR gates 76$_1$ to 76₄, while since the AND gates 75₂, 75₅, 75₈ and 75₁₁ are gated on, the signals Av1 to Av4 are directed to the OR gates 77₁ to 77₄. The outputs of the OR gates 76₁ to 76₄, or signals Tv1 to Tv4, are supplied through the decoder and segment driver 79 to the display circuit 80 and also to the decoder 81₁ of the shutter time extension circuit 81. The outputs of the OR gates 77₁ to 77₄, or signals Av1 to Av4 are supplied through the decoder and segment driver 79 to the display circuit 80 and also to the subtracter 68 and maximum and minimum range magnitude comparators 85 and 86. In the subtracter 68, the signals Av1 to Av4 are subtracted by the signals Avo1 to Avo4 to obtain signals dAv1 to dAv4 representative of the difference between the maximum diaphragm aperture and the proper one.

Assuming that the computed exposure value exceeds the maximum possible diaphragm value, then the comparator 85 produces an output having a logic "1" value which is applied through the OR gate 89₁ to the decoder and driver 79 for indicating that the preliminary set value of shutter time must be altered to a faster value by operating the button 10 and knob 9 again until the warning light signal of arrow shape disappears. Alternatively, assuming that the computed exposure value exceeds the minimum possible diaphragm value, the comparator 86 is rendered to produce an output of a logic "1" value which is applied through the OR gate 89₂ to the decoder and driver 79. The photographer is hereby informed of the fact that a smaller size of diaphragm aperture than the minimum possible one is necessary. Therefore, the preliminarily set value of shutter time must be altered to a longer value.

Upon further depression of the shutter button 3, the switch S9 is closed to actuate a switching circuit 55 for energizing the magnetic winding Mg2 in the form of an impulse having electrical power supplied from a capacitor C4. Since the magnetic flux of the permanent magnet piece is cancelled out by the energized magnetic winding Mg2, the first latching lever 113 is turned clockwise by the action of the spring 113c, causing the release lever 114 to turn counterclockwise against the force of the spring 114f to disengage the lever 116 from the sector gear 118 and at the same time to move the holding lever 150 away from the arresting lever 130.

Scanning operation of the diaphragm setting mechanism goes on under the action of the spring 103a which drives the diaphragm presetting ring 103 along with the sector gear 118 and governor 119 with the final stage gear or stop wheel 119 rotating in a counterclockwise direction. As the slider 118b is travelling over a sequence of switch elements S11 in the comb-tooth form 161, an ever increasing number of pulses is applied to the counter 90₂ upon coincidence with the output of the subtracter 68 as detected by the comparator 90₃ to actuate the magnet winding Mg1 for de-energization. Such de-energization causes counterclockwise movement of the arresting lever 130 to stop the wheel 119c together with the sector gear 118. Thus, the arrested position of the sector gear 118 determines the amount of movement of the presetting ring 103 which is translated to the proper diaphragm value by a bell-crank mechanism (not shown). In other words, the proper diaphragm value is automatically formed as a function of the object brightness lever, preselected shutter time and film speed.

Meanwhile, the release lever 114 actuates the mirror latching lever 115 to turn in a clockwise direction, causing the mirror drive lever 111 to turn in the counterclockwise direction by the action of the drive spring 111d. Motion of the mirror drive lever 111 is transmitted through the mirror return control lever 136 to the control lever 137. Counterclockwise movement of the control lever 137 causes upward movement of the mirror 138 and at the same time causes clockwise movement of the diaphragm drive lever 105 which, in turn, causes movement of the diaphragm closing down lever 104 to the left.

In synchronism with the upward movement of the mirror 138, a delay mechanism (not shown) is actuated to operate for assuring a full range of movement of the diaphragm blades, and then the mirror drive lever 111 strikes the front curtain latching lever 133 to disengage from the master gear 134 to thereby initiate an exposure. At this time, the switch S10 is opened, causing the counter 81₄ to count the clock pulse train from the generator 81₂. When the output of the counter 81₄ which is detected by the magnitude 81₅ has reached a level equal to that of the decoder 81₁, the comparator 81₅ changes its output to a "1" level at which the transistor 82₂ is rendered conducting, causing the magnetic winding to suddenly draw the electrical energy from the capacitor C5. As the energized magnetic winding Mg3 cancels out the magnetic flux of the permanent magnet associated therewith, the rear curtain latching lever 140 is moved away at its pawl from the pin 139a on the master gear 139, thereby the rear curtain is driven by a drum spring (not shown) to run down so as to terminate the exposure.

Since the release of the shutter results in closure of the switch S7, one pulse of logic potential "1" is given to the trigger input of the counter 33, so that the counter 33 advances one count. The output of the counter 33 is supplied through the decoders 205, 232 and 233 to the 7-segment drivers 234 and 235 for the display of the number "1" which can be seen through the window 5₃. In FIG. 5, the display of the number "20" indicates that twenty frames have been exposed. Accordingly, nine more frames will be exposed without causing production of a sound from the buzzer 155 at the time of depression of the shutter button 3.

At the termination of movement of the rear curtain gear 139, the signal lever 141 is turned in the counterclockwise direction by the pin 139a, causing the mirror return control lever 136 to disengage from the drive lever 111. The mirror control lever 137 is then turned in the clockwise direction along with counterclockwise movement of the diaphragm drive lever 105 by the combined action of the springs 138c and 105a, so that the mirror 138 is moved to the viewing position and the diaphragm closing down member 104 follows up the lever 105 with the diaphragm blades finally set in the full open position.

To advance the film one frame and reset all of the mechanisms to the cocked position, the photographer will next operate the lever 1 (FIG. 1). During this film winding and shutter cocking operation, motion of the cam disc 109 is transmitted through the intermediate levers 110 and 107 to charge the escapement 112 and the mirror drive lever 111. Thus, one cycle of camera operation in "TP" mode has been completed.

(2) Diaphragm Preselection Automatic Shutter Range

When the "TP" setting card 8₁ is replaced by a "FP" setting card 8₂, of which encoded information is (100010), MODE-SET counter 14 changes its outputs m1, m2 and m3 from (000) to (100) without causing disturbance of the settings of FACTOR-SET and FILM SPEED-SET counters 23 and 39. Assuming that the preceeding exposure in "TP" mode was effected with 1/250 second, then the display of 16 is presented with the heading display of "TP" as shown in FIG. 5(b). The outputs m1, m2 and m3 of counter 14 are decoded by the counter 44 to produce a "1" switch signal only at the output stage 1. This switch signal is used as a signal FP by which the AND gates $74_2$, $74_4$, $74_8$, $74_{11}$, $75_3$, $75_6$, $75_9$ and $75_{12}$ are enabled. Therefore, the signals SET1 to SET4 are directed to the diaphragm setting control circuit 90, while the outputs U1 to U4 of the computer or subtracter 70 are directed to the shutter timing control circuit 81. It is noted here that there is no possibility for the maximum and minimum diaphragm range comparators 85 and 86 of producing a "1" signal as in "TP" mode, because the signals Av1 to Av4 at that time are determined by the desired value of diaphragm aperture. Switch signal FP is also supplied to the display control circuit 79 for shifting an underline from the shutter time display to the diaphragm value display to indicate that the selected mode is "FP".

When the shutter button 3 is depressed to the first stroke, and when the computed exposure value exceeds the longest shutter time, the maximum range comparator 84 produces a "1" signal which is applied through the OR gate $89_1$ to the display control circuit 79, informing the photographer of the fact that an over-exposure will result. The photographer will then turn to manipulate the knob 9 and button 10 until the warning signal disappears. Conversely, when the computed exposure value exceeds the shortest shutter time, the minimum range comparator 84 produces a "1" output so that it is now indicated that an over-exposure will result.

After a correct exposure value has been derived, the photographer is allowed to further depress the shutter button 3. A diaphragm scanning operation then proceeds in a manner similar to that described in connection with "TP" mode, but is different in that the diaphragm presetting ring 103 is adjusted in position in accordance with the preset value of diaphragm aperture. it is noted here that there is no need to manipulate the diaphragm ring 101 for the purpose of presetting this diaphragm value. On the other hand, the period of actuation of the shutter is controlled in accordance with the object brightness, preselected diaphragm value and film speed.

(3) Shutter Preselection Magic Program

A "TPM" setting card $8_3$ has binary coded information (010010) of which the last three words are the same as those of "TP" and "FP" setting cards $8_1$ and $8_2$. Responsive to the first three binary words (010), the decoder 44 produces a "1" switch signal TPM which not only has the same effect on the program selection logic 73 as that of the switch signal TP, but also functions to assist in automatic correction of the preset value of shutter time, when the computed exposure value falls beyond the upper or lower limit of the given diaphragm range.

If the upper limit is exceeded, the maximum range comparator 85 provides a "1" output which is supplied to the display control circuit 79 through the OR gate $89_1$ and which serves as a switch signal DM after it passes through the AND gate $87_3$ which is already gated on along with the AND gate $87_4$ by and through the OR gate 54. Since this output, as the switch signal DM is not applied to the U/D input of the shift register 47, the latter remains set in the down-counting mode. While the oscillator 50 is rendered operative at the time of actuation of the shutter button 3, the advent of the switch signal DM on the AND gate 52 causes the shift register 47 to start the counting of the pulse train from the oscillator 50. Each time the DOWN counter 47 advances one count, the output of the computer 70 is shifted down one step, reaching the upper limit of the diaphragm range at which the warning arrow signal in the viewfield of the finder 80 disappears, and the switch signal DM changes its potential to a "0" level. Thus, the automatic correcting operation has been completed with the resulting value of exposure factor, i.e., shutter time being displayed only in the field of view of the finder 80.

Conversely, when the lower limit is exceeded, the minimum range comparator 86 is caused to produce a "1" output which serves as the switch signal UM for setting the shift register 47 to the up-counting mode. Therefore, the UP counter 47 advances the output of the computer 70 up to the lower limit of the diaphragm range and also the value of shutter time toward a faster limit. Upon attainment of the output of the computer 70 of the lower limit of the diaphragm range, the minimum range comparator 86 changes its output to a "0" level at which the shift register 47 stops counting any further.

(4) Diaphragm Preselection Magic Program

A "DPM" setting card $8_4$ has binary words (110010) of which the first three give the external display of the selected mode and the preset value of diaphragm aperture as shown in FIG. 5(d), and after having been decoded to a switch signal FPM, reestablishes "FPM" mode of operation of the logic 73. The other words effect the same result as that of the aforesaid "FP" card. If the computed exposure value exceeds the upper limit of the shutter range, the maximum range comparator 83 produces a "1" output which is supplied to the display control circuit 79 with the upwardly pointed arrow being lighted on to indicate that a necessary automatic correction of the preset value of diaphragm aperture is under progress. This operation is performed in a similar manner to that described in connection with "TPM" mode. After the warning signal is lighted off, the photographer will further depress the shutter button to the second stroke. Conversely, when the lower limit of the shutter range is exceeded, the downwardly pointed arrow is lighted on and the minimum range comparator 84 is actuated to produce a "1" output which serves as a switch signal UM. Subsequent operation proceeds in a similar manner to that described in connection with "TPM" mode. Consequently, an exposure is taken with the shortest shutter time and a corrected value of diaphragm aperture which is larger than the preset value, in other words, the size of diaphragm apertute opening is smaller.

(5) Dual-Range Program

A "P" setting card $8_5$ of (001010) when inserted into the receptacle 7 in place of "FPM" setting card $8_4$ shuts off the display of the number "16" as the preset value of exposure factor, as shown in FIG. 5(e). Since the decoder 44 produces a switch signal PRG, the selection logic 73 has only the AND gates $74_1$, $74_4$, $74_7$, $74_{10}$, $75_1$, $75_4$, $75_7$ and $75_{10}$ enabled so that the signals SET1 to SET4 of the counter 23 and the outputs U1 to U4 of the subtracter 70 are blocked. Instead, the outputs S1 to S5 of the second adder 69 after being shifted by one bit, that is, signals (½)Ev2 to (½)Ev5, are introduced into the shutter timing and diaphragm setting control circuits 81 and 90. In this case, $AV=TV=\frac{1}{2}EV$. The outputs Tv1 to Tv4 and Av1 to Av4 of the logic 73 are displayed in the viewfield of the finder 80 in combination with or without underlines below the respective digit numbers. The shutter timing and diaphragm setting operation proceeds in a similar manner to that described above. Although a correct exposure value can be derived over a wider range of photographic situations, a particular situation may be encountered where the output of the adder 69 of the computer exceeds the upper limits or lower limits of the shutter and diaphragm ranges at the same time. This is also indicated by either one of the warning arrow signals. If so, the camera per se is no longer effective and the use of a filter or flash light is required.

(6) Manual Setting of the Various Automatic Exposure Modes

If the photographer desires to employ a mode different from those of the cards at hand, or if he lost the corresponding card from the neighborhoood of the camera, or if he requires frequent changes of the mode, it is possible to manually set the camera in a desired mode. In any case, the receptacle 7 must at first be made empty of the card 8, and then the controlling push button $4_1$ may be depressed and held in, while the safety button 6 is simultaneously held in the depressed position. With the counter 14 in the initial setting state, the display of "TP" mode will be first presented for the brief dwell period, after which it is replaced by a display of "FP" mode. Such change recurs through one cycle of five setting states as shown in Table 1 so long as the buttons $4_1$ and 6 are held in the depressed positions. To set or adjust the MODE display, the photographer needs to release one of the buttons $4_1$ and 6 in synchronism with the presentation of the desired display while looking at the window $5_1$.

It is noted here that the 6th contact m6 takes a potential of logic "1" level which differs from that occurring when the card 8 is used. This will render the buzzer 155 inoperative so that no sound is heard when the shutter button 3 is depressed to start exposure of any of the remaining six fresh frames.

(7) Manual Exposure Mode

The foregoing discussion has been conducted with reference to the automatic exposure modes. Now, explanation will be made as to how to control the period of actuation of the shutter in accordance with the output of FACTOR-SET counter 23 and how to adjust the size of diaphragm aperture in accordance with the position of diaphragm ring 101. When the diaphragm ring 101 is turned from "AE" position to place a graduation corresponding to the desired diaphragm value in registry with the index 102, the cam lobe 101b is moved away from the rod 142, causing the lever 143 to be turned in the counterclockwise direction by the bias of a spring 143a. The switch S6 is then closed and the lever 170 is driven by a spring 170a so as to follow up the lever 143. Also, the lever 171 follows up the lever 170 under the action of the spring 171a to lock the arresting lever 130. Thus, the diaphragm setting scanning mechanism assumes a position where an extension 103b of the presetting ring 103 abuts against a stop lug 101a of the diaphragm ring 101 when the camera release lever 114 is actuated.

Closure of the switch S6 causes production of a switch signal of "0" level which is applied to the NAND gate 31 to reset the MODE-SET counter 14. Therefore, the counter 14 produces outputs m1 to m3, all of which are at "0" values as in "TP" mode, regardless of whether or not the card 8 is present in the receptacle 7. The signals SET1 to SET4 are thereby directed by the logic 73 to the shutter timing control circuit 81.

Figure 6:
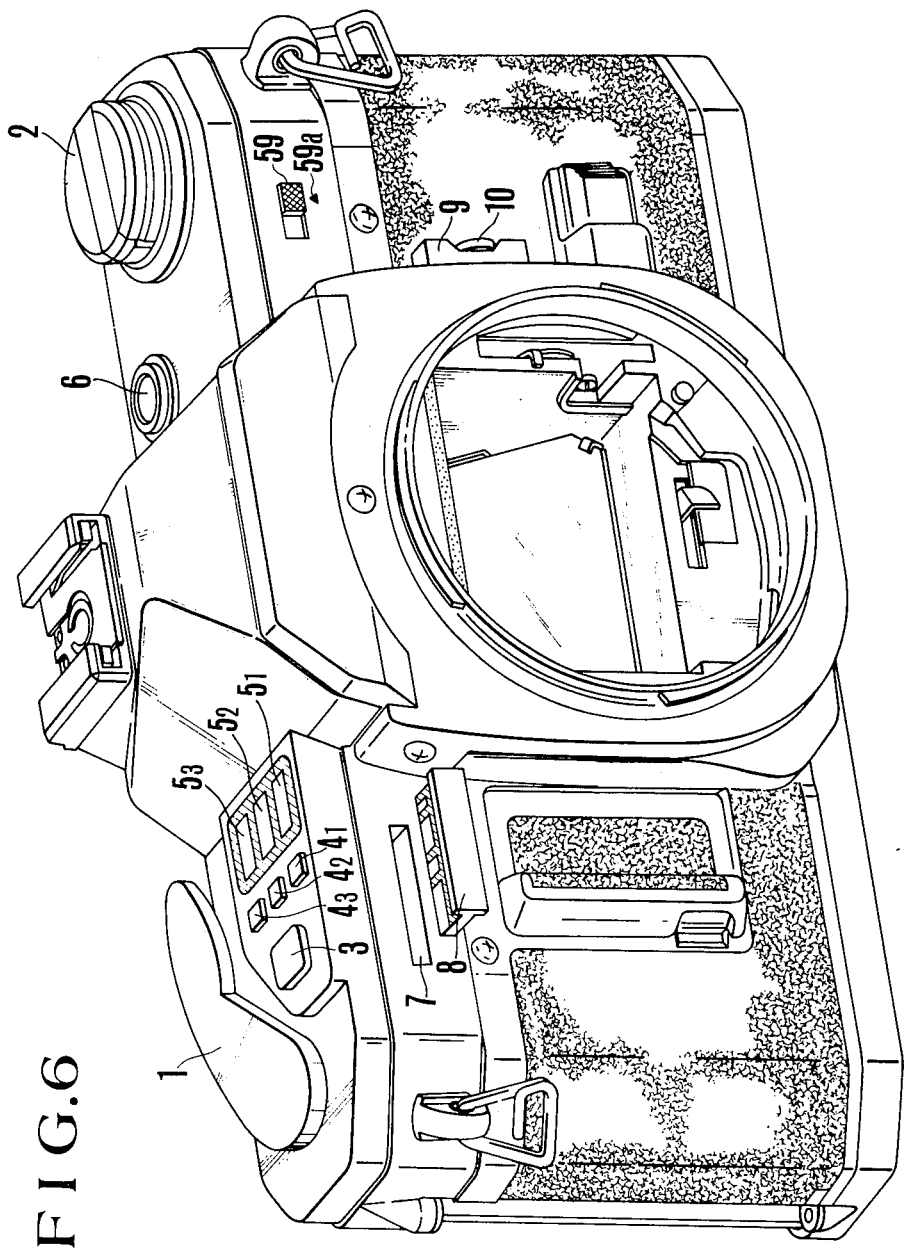
FIGS. 6, 7, 8(a) and 8(b) are similar views to those of FIGS. 1 to 3, respectively, showing another embodiment of the invention.
Figure 7:
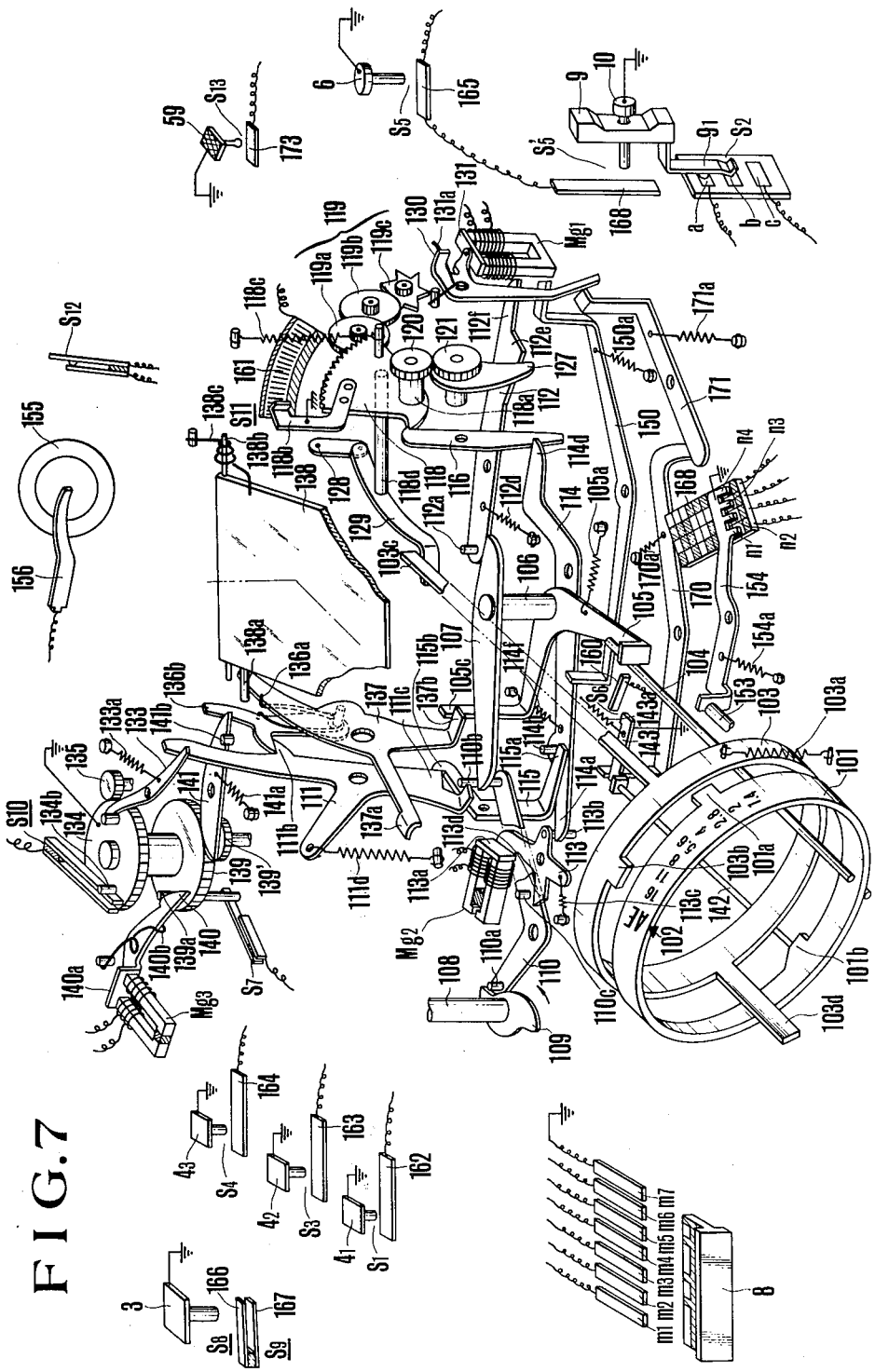
Figure 8A:
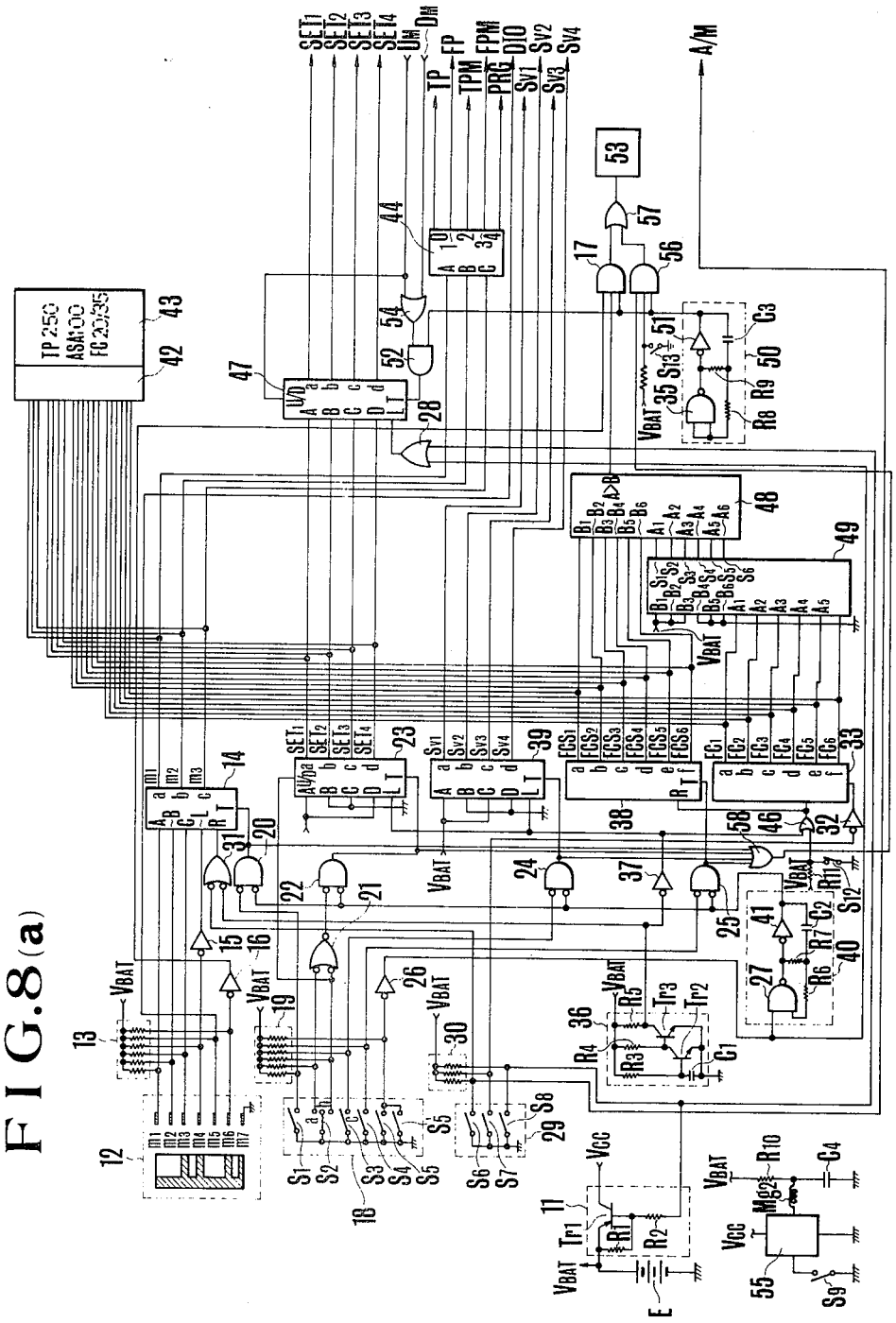
Figure 8B:
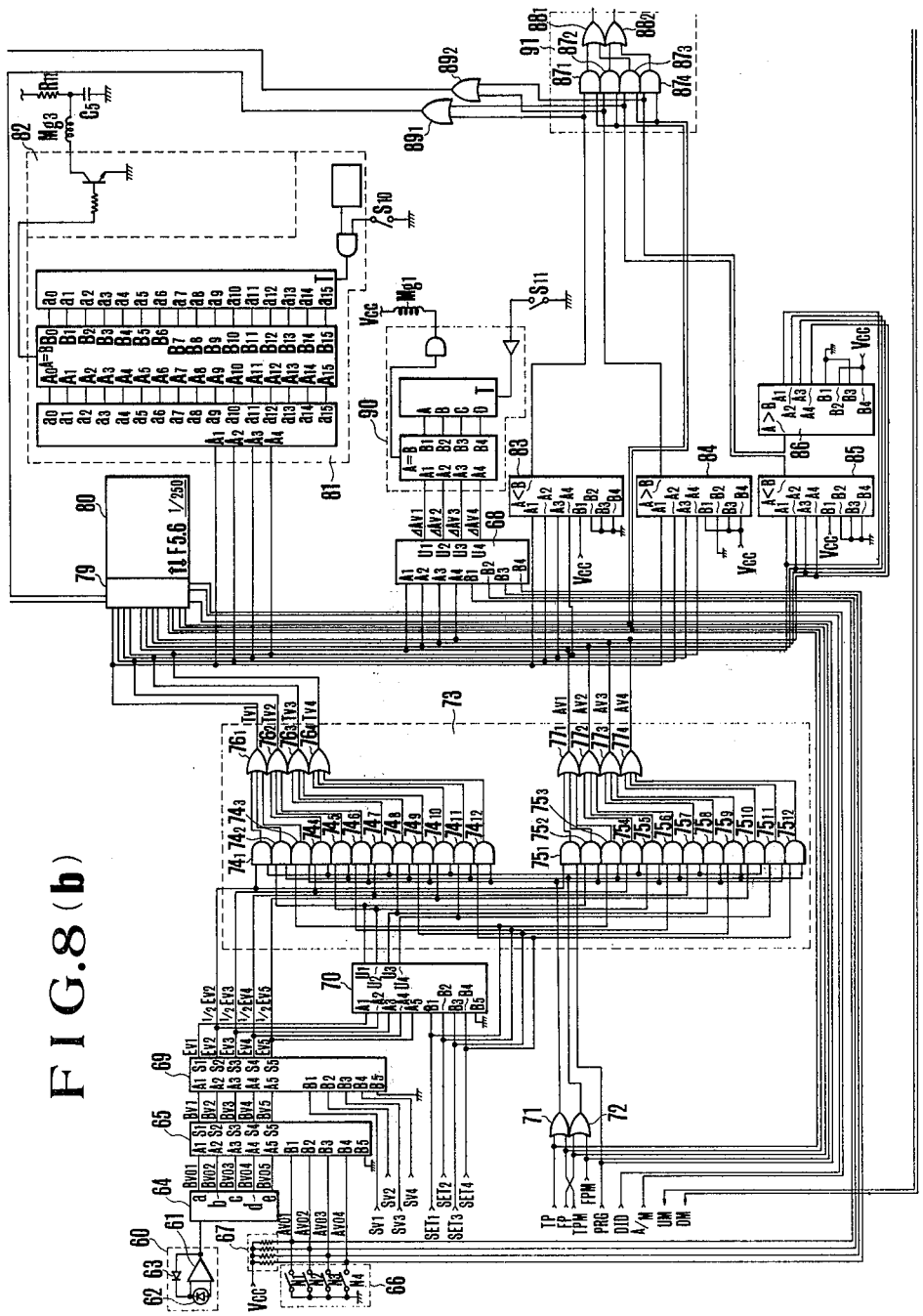

FIGS. 6, 7 and 8 show another embodiment of the present invention which is different from the above embodiment only in that each time any of the SET counters 14, 23, 39 and 38 advance one count, a sound signal of short duration can be heard to assist the photographer in establishing a desired setting as soon as possible, as a great number of setting states in one cycle are successively presented, each for a brief dwell period. For this purpose, there is provided a device having a control switch knob 59 positioned to be accessible from the outside of the camera housing, as shown in FIG. 6. With the knob 59 aligned with a stationary index 59a, a switch S13 is open so that an AND gate 56 (see FIG. 8(a)) is enabled. The output of the AND gate 56 is applied to the buzzer control circuit 53 through an OR gate 57, through which the output of the AND gate 17 is also applied. All of the NOR gates 20, 22, 24 and 25 have their outputs connected through a common OR gate 58 to a second input of the AND gate 56. A pulse train is always applied to a third input of the AND gate 56 from an oscillator 50 which is slightly different from that of FIG. 3(a) in that the two inputs of the NAND gate 35 are connected to each other, and the switch S8 is disconnected from the NAND gate 35 with omission of the inverter 34. If the photographer does not wish to hear such sound signals, he needs only to move the knob 59 to the left to close the switch S13.

While the various circuit elements of FIGS. 3(a), 3(b), 8(a) and 8(b) are well-known in the art, the following is a listing of off-the-shelf digital components which may, for example, be used for the more complex elements of these figures:

| Circuit Element | Exemplary Manufacturer and Part Number | |
|---|---|---|
| Presettable up-down counter 14 | RCA Corporation | CD4029 |
| Presettable up-down counter 23 | " | CD4029 |
| Film speed-set presettable up-down counter 39 | " | CD4029 |
| Film capacity-set primary counter 38 | " | CD4020 |
| Footage-set primary counter 33 | " | CD4020 |
| Magnitude comparator 48 | " | CD4063 |
| Up-down counter 47 | " | CD4029 |
| Adder 49 | " | CD4008 |
| Adder 65 | " | CD4008 |
| Subtracter 68 | " | CD4008+AND gate + Inverter |
| Adder 69 | " | CD4008 |
| Subtracter 70 | " | CD4008+AND gate + inverter |

| Circuit Element | Exemplary Manufacturer and Part Number |
|---|---|
| Decoder 811 | " CD4514 |
| Counter 814 | " CD4020 |
| Magnitude comparator 815 | " CD4063 |
| Comparator 83 | " CD4063 |
| Comparator 84 | " CD4063 |
| Maximum range magnitude Comparator 85 | " CD4063 |
| Minimum range magnitude Comparator 86 | " CD4063 |

It will be seen from the foregoing that the present invention provides a photographic camera having a great number of automatic exposure modes with a setting system rendering it possible to establish a desired mode in accordance with orders in digital form. The use of such digital control system enables a digital display of not only exposure factors but also film capacity and footage in a very compact area as if the camera were of the single-purpose type. This aspect of the camera is further enhanced by providing the corresponding number of mode setting members in separate form from the camera housing and by conforming each member to the camera housing when it is inserted into a receptacle therefor. Because the number of different mode setting members is large, it will often happen that the photographer cannot find a desired member near him, or that the aimed member was lost before, or that the given photographic situations require a great number of changes in mode. Even in these cases, the photographer may take photographs by merely depressing and releasing a controlling button. Further, the provision of audio-visual management of the button facilitates minimization of the labor of the photographer in setting not only the desired mode but also other photographic information. Again, the invention enables the photographer to become aware of how many number of fresh film frames remain and, therefore, he can avoid missing a good shutter opportunity after the last frame has been exposed, since premature replacement of the film by a new one is possible.

While the foregoing description and drawings represent the preferred embodiments of the present invention, it will be obvious to those skilled in the art that various changes and modifications may be made therein without departing from the true spirit and scope of the present invention.

What is claimed is:

1. An automatic exposure control apparatus for a camera comprising:
   (a) light measuring means for producing an electrical signal proportional to the level of brightness of an object being photographed;
   (b) exposure factor setting means for producing electrical signals proportional to preset values of exposure factors;
   (c) exposure value computing means responsive to the electrical signals from said light measuring and said factor setting means for producing an output;
   (d) shutter control means;
   (e) diaphragm control means;
   (f) exposure mode selecting means responsive to first and second switch signals for directing the output of said computing means to either of said shutter control means and said diaphragm control means, respectively; and
   (g) signal forming means having terminals receptive of one of a number of different mode setting members upon reading of information on said mode setting member for producing either one of said first and second signals to be applied to said mode selecting means.

2. An apparatus according to claim 1, wherein said mode selecting means comprises a first gate circuit which is enabled by said first switch signal so that the output of said computing means is directed to said shutter control means, and a second gate circuit which is enabled by said second switch signal so that the output of said computing means is directed to said diaphragm control means.

3. An apparatus according to claim 2, wherein said exposure factor setting means comprises a first setting means for setting film sensitivity, a second setting means for setting shutter time or diaphragm aperture and a pulse generator, said first setting means having a first counter for counting a pulse train from said pulse generator, and said second setting means having a second counter for counting the pulse train from said pulse generator.

4. An apparatus according to claim 3, wherein said first setting element has a first switch connected between said first counter and said pulse generator, and said second setting element has a second switch connected between said second counter and said pulse generator.

5. An apparatus according to claim 4, further including warning means for producing a warning signal each time one pulse is applied to said first or second counter.

6. An apparatus according to claim 4, further including display means responsive to the outputs of said first and second counters for displaying the set values of exposure factors.

7. An apparatus according to claim 1, further including:
   (a) pulse generating means;
   (b) a first switch accessible from the outside of the camera housing for setting a maximum possible number of film frames;
   (c) a first counter cooperative with said first switch for counting a pulse train from said pulse generating means in order to set said number;
   (d) a second counter cooperative with an internal mechanism of said camera for advancing one count each time one frame has been exposed;
   (e) comparing means for comparing the outputs of said first and second counters with each other upon attainment of a predetermined relationship for producing a warning signal; and
   (f) warning means for converting said warning signal to an audible or visible signal.

8. An apparatus according to claim 7, further including a second switch cooperative with a back cover of said camera and operating upon opening of said cover to reset said first and second counters.

9. An automatic exposure control apparatus for a camera including:
(a) light measuring means for producing an electrical signal proportional to the object brightness level;
(b) exposure factor setting means for producing electrical signals proportional to the set values of exposure factors, said means being associated with correcting means responsive to a switch signal for producing an electrical signal proportional to a corrected value of exposure factor;
(c) exposure value computing means responsive to the outputs of said light measuring means and said exposure factor setting means for producing an output;
(d) shutter control means;
(e) diaphragm control means;
(f) exposure mode selecting means for directing the output of said computing means to either one of said shutter control and said diaphragm control means, said means comprising a first gate circuit which is enabled by a first switch signal so that the output of said computing means is applied to said shutter control means, and a second gate circuit which is enabled by a second switch signal so that the output of said computing means is applied to said diaphragm control means;
(g) first detecting means for detecting whether or not the output of said first gate circuit is outside a dynamic range of said shutter control means and for producing an actuating signal to be applied to said correcting means when the output of said first gate circuit is outside the dynamic range;
(h) second detecting means for detecting whether or not the output of said second gate circuit is outside a dynamic range of said diaphragm control means and for producing an actuating signal to be applied to said correcting means when the output of said second gate circuit is outside the dynamic range; and
(i) signal forming means for producing first and second switch signals for controlling the operation of said mode selecting means, said means having terminals receptive of one of a number of different mode setting members upon reading of information on said mode setting member for applying either of said first and second signals to said mode selecting means.

10. An apparatus according to claim 9, further including gate means interposed between said mode selecting means and said signal forming means and wherein said signal forming means produces one of four signals, namely, a shutter preselection signal, a shutter preselection magic signal, a diaphragm preselection signal and a diaphragm preselection magic signal, so that when said signal forming means produces either of said shutter preselection signal and said shutter preselection magic signal, said gate means produces said second switch signal, while when said signal forming means produces either of said diaphragm preselection signal and said diaphragm preselection magic signal, said gate means produces said first switch signal.

11. An apparatus according to claim 10, wherein said first detecting means is actuated when a first counter produces said diaphragm preselection magic signal, and said second detecting means is actuated when a second counter produces said shutter preselection magic signal.

12. An apparatus according to claim 9, further including:
(a) pulse generating means for producing a pulse train;
(b) a first switch accessible from the outside of the camera housing for setting a maximum possible number of film frames;
(c) a first counter cooperative with said first switch for counting the pulse train in order to set said number;
(d) a second counter cooperative with an internal mechanism of said camera for advancing one count each time one frame has been exposed;
(e) comparing means for comparing the outputs of said first and second counters with each other upon attainment of a predetermined relationship to produce a warning signal; and
(f) warning means for converting said warning signal to an audible or visible signal.

13. An apparatus according to claim 12, further including a second switch cooperative with a back cover of said camera and operating upon opening of said cover to reset said first and second counters.

14. An apparatus according to claim 12, further including a second switch cooperative with a back cover of said camera and operating upon opening of said cover to reset said first and second counters.

15. An automatic exposure control apparatus for a camera including:
(a) light measuring means for producing an electrical signal proportional to the brightness level of an object being photographed;
(b) exposure factor setting means having:
(1) pulse generating means for producing a pulse train;
(2) a first counter for counting the pulse train from said generating means to set a desired value of exposure factor;
(3) a first switch connected between said generating means and said first counter; and
(4) a second counter responsive to a control signal for correcting the set value of exposure factor;
(c) exposure value computing means responsive to the outputs of said light measuring means and said second counter for producing an output;
(d) shutter control means;
(e) diaphragm control means;
(f) exposure mode selecting means for directing the output of said computing means to either one of said shutter control means and said diaphragm control means, said means including a first gate circuit which is enabled by either one of first and second switch signals so that the output of said computing means is applied to said shutter control means, and a second gate circuit which is enabled by either one of third and fourth switch signals so that the output of said computing means is applied to said diaphragm control means;
(g) first detecting means rendered operative by said second signal when it is detected that the output of said first gate circuit is outside the dynamic range of said shutter control means to produce an actuating signal which is applied to said second counter.
(h) second detecting means rendered operative by said fourth signal when it is detected that the output of said second gate circuit is outside the dynamic range of said shutter control means to produce an actuating signal which is applied to said second counter; and (i) a third counter having input terminals receptive of information of one of a number of different mode setting members and responsive to the reading of the information on the selected member for producing one of said first, second, third and fourth signals for controlling operation of said mode selecting means.

16. An apparatus according to claim 15, further including warning means for producing a warning signal each time one pulse is applied to said second counter.

17. An apparatus according to claim 15, further including display means responsive to the outputs of said second and third counters for displaying the set mode and the preset value of the exposure factor.

18. An automatic exposure control apparatus for a camera including:
(a) light measuring means for producing an electrical signal proportional to the object brightness level;
(b) exposure factor setting means for producing electrical signals proportional to the preset values of exposure factors;
(c) exposure value computing means responsive to the outputs of said light measuring means and said exposure factor setting means for producing an output;
(d) shutter control means;
(e) diaphragm control means;
(f) exposure mode selecting means responsive to first and second signals for directing the output of said computing means to either of said shutter and said diaphragm control means and responsive to a third signal for directing the output of said computing means to both said shutter and said diaphragm control means; and
(g) signal forming means having input terminals receptive of information on one of a number of different mode setting members and responsive to insertion of the mode setting member into said camera for producing one of said first, second and third signals which are applied to said exposure mode selecting means.

19. An apparatus according to claim 18, wherein said mode selecting means includes a first gate circuit which is enabled by said first signal so that the output of said computing means is applied to said shutter control means, a second gate circuit which is enabled by said second signal so that the output of said computing means is applied to said diaphragm control means, and a third gate circuit which is enabled by said third signal so that the output of said computing means is applied to both said diaphragm control means and said shutter control means.

20. An apparatus according to claim 19, wherein said exposure factor setting means includes a first setting element for setting film sensitivity, a second setting element for setting a preselected exposure factor and a pulse generating source for producing a pulse train, said first and second setting elements having first and second counters, respectively, for counting the pulse train.

21. An apparatus according to claim 20, wherein said first setting element has a first switch connected between said first counter and said pulse generating means, and said second setting element has a second switch connected between said second counter and said pulse generating means.

22. An apparatus according to claim 21, wherein said exposure value computing means has a first computing section responsive to the outputs of said light measuring means and said first and second counters for producing a first output which is applied to said first and second gate circuits and has a second computing section responsive to the outputs of said light measuring means and said first counter for producing a second output which is applied to said third gate circuit.

23. An apparatus according to claim 21, further including display means responsive to the outputs of said first and second counters for displaying the set mode and the preset values of exposure factors.

24. An apparatus according to claim 18, further including:
(a) pulse generating means for producing a pulse train;
(b) a first switch accessible from the outside of the camera housing for setting a maximum possible number of film frames;
(c) a first counter cooperative with said first switch for counting the pulse train from said pulse generating means in order to set said number;
(d) a second counter cooperative with an internal mechanism of said camera for advancing one count each time one frame has been exposed;
(e) comparing means for comparing the outputs of said first and second counters with each other and, upon attainment of a predetermined relationship between them, producing a warning signal; and
(f) warning means for converting said warning signal to an audible or visible signal.

25. An apparatus according to claim 24, further including a second switch cooperative with a back cover of said camera and operating upon opening of said cover to reset said first and second counters.

26. An automatic exposure control apparatus for a camera including:
(a) light measuring means for producing an electrical signal proportional to the brightness level of an object being photographed;
(b) exposure factor setting means for producing electrical signals proportional to the set values of exposure factors, said means being associated with correcting means responsive to a control signal for producing an electrical signal proportional to a corrected value of exposure factor;
(c) exposure value computing means responsive to the outputs of said light measuring means and said exposure factor setting means for producing an output;
(d) shutter control means;
(e) diaphragm control means;
(f) exposure mode selecting means for directing the output of said computing means to either or both of said shutter and said diaphragm control means, said means including a first gate circuit which is enabled by a first switch signal so that the output of said computing means is applied to said shutter control means, a second gate circuit which is enabled by a second switch signal so that the output of said computing means is applied to said diaphragm control means, and a third gate circuit which is enabled by a third switch signal so that the output of said computing means is applied to both said shutter and said diaphragm control circuits;
(g) first detecting means for detecting whether or not the output of said first gate circuit is outside the dynamic range of said shutter control means and, when such output is outside the dynamic range, for producing an actuating signal which is applied to said correcting means;

(h) second detecting means for detecting whether or not the output of said second gate circuit is outside a dynamic range of said diaphragm control means and, when such output is outside the dynamic range, for producing an actuating signal which is applied to said correcting means;

(i) signal forming means having a mode information reader arranged upon selective reception of a number of different mode setting members from the outside of the camera housing for producing one of said first, second and third signals which is applied to said mode selecting means.

27. An apparatus according to claim 26, further including gate means interposed between said mode selecting means and said signal forming means and wherein said signal forming means produces one of five signals, namely, a shutter preselection signal, a shutter preselection magic signal, a diaphragm preselection signal, a diaphragm preselection magic signal and a program signal so that, when said signal forming means produces either of said shutter preselection signal and said shutter preselection magic signals, said gate means produces said second switch signal; when said signal forming means produces either of said diaphragm preselection signal and said diaphragm preselection magic signal, said gate means produces said first switch signal; and when said signal forming means produces said program signal, said gate means produces said third signal.

28. An apparatus according to claim 27, further including a first counter for producing said diaphragm preselection magic signal which actuates said first detecting means, and a second counter for producing said shutter preselection magic signal which actuates said second detecting means.

29. An apparatus according to claim 26, further including:
(a) pulse generating means for producing a pulse train;
(b) a first switch accessible from the outside of the camera housing for setting a maximum possible number of film frames;
(c) a first counter cooperative with said first switch for counting the pulse train in order to set said number;
(d) a second counter cooperative with an internal mechanism of said camera for advancing one count each time one frame has been exposed;
(e) comparing means for comparing the outputs of said first and second counters with each other upon attainment of a predetermined relationship for producing a warning signal; and
(f) warning means for converting said warning signal to an audible or visible signal.

30. An automatic exposure control apparatus for a camera including:
(A) light measuring means having:
(a) photosensitive means for producing an electrical signal proportional to the brightness level of an object being photographed; and
(b) analog-to-digital converting means for converting the analog signal of said photosensitive means to a digital signal;
(B) pulse generating means for producing a pulse train;
(C) exposure factor setting means having:
(a) a first switch accessible from the outside of the camera housing for use in setting an exposure factor;
(b) a second switch accessible from the outside of the camera housing for use in setting film sensitivity;
(c) a first counter for setting the exposure factor, said first counter counting the pulse train in response to actuation of said first switch;
(d) a second counter for setting the film sensitivity, said second counter counting the pulse train in response to actuation of said second switch; and
(e) a third counter which is provided for a setting value altering purpose and is receptive of the output of said first counter, said third counter being arranged to alter the count output of the first counter by counting oscillation pulses produced by said pulse generating means while a detecting signal is being applied thereto;
(D) exposure value computing means responsive to the outputs of said light measuring means and said exposure factor setting means for producing an output in digital form, said means having:
(a) first computing means for digitally computing the outputs of said analog-to-digital converting means, said first counter and said second counter; and
(b) second computing means for digitally computing the outputs of said analog-to-digital converting means and said second counter;
(E) shutter control means;
(F) diaphragm control means;
(G) exposure mode selecting means having;
(a) a first gate circuit enabled by either of first and second signals to apply the output of said first computing means to said shutter control means;
(b) a second gate circuit enabled by either of third and fourth signals to apply the output of said first computing means to said diaphragm control means; and
(c) a third gate circuit enabled by a fifth signal to apply the output of said second computing means to both said shutter and said diaphragm control means;
(H) first detecting means rendered operative by said second signal when the output of said first gate circuit is outside the dynamic range of said shutter control means for producing an actuating signal which is applied to said third counter;
(I) second detecting means rendered operative by said fourth signal when the output of said second gate circuit is outside the dynamic range of said diaphragm control means for producing an actuating signal which is applied to said third counter; and
(J) a fourth counter having a mode information reader arranged upon selective reception of a number of different mode setting members from the outside of the camera housing for producing one of said first, second, third and fourth signals.

31. An apparatus according to claim 30, further including warning means for producing a warning signal each time one pulse is applied to said first and second counters.

32. An apparatus according to claim 30, further including display means for displaying the preset value of exposure factor and the selected mode based on the outputs of said first, second and fourth counters.

33. An automatic exposure control apparatus for a camera including:
(A) light measuring means for producing an electrical signal proportional to the brightness level of an object being photographed;
(B) exposure factor setting means for producing electrical signals proportional to the preset values of exposure factors;
(C) exposure value computing means responsive to the outputs of said light measuring means and said exposure factor setting means for producing an output;
(D) shutter control means;
(E) diaphragm control means;
(F) exposure mode selecting means responsive to a first signal for directing the output of said computing means to said shutter control means and responsive to a second signal for directing the output of said computing means to said diaphragm control means;
(G) pulse generating means for producing a pulse train;
(H) a first counter for counting the pulse train for producing either one of said first and said second signals depending upon the number of pulses counted; and
(I) a first switch accessible from the outside of the camera, said first switch being arranged to cause a number of pulses corresponding to the switching operation time of the first switch to be applied to said first counter and to cause the first counter to produce either the first signal or the second signal thereof according to the count value of the first counter.

34. An apparatus according to claim 33, wherein said mode selecting means has a first gate circuit which is enabled by said first signal so that the output of said computing means is applied to said shutter control means, and a second gate circuit which is enabled by said second signal so that the output of said computing means is applied to said diaphragm control means.

35. An apparatus according to claim 34, wherein said exposure factor setting means has a first setting member for setting film sensitivity and a second setting member for setting a preselected exposure factor, said first setting member having a second counter for counting the pulse train and said second setting members having a third counter for counting the pulse train.

36. An apparatus according to claim 35, wherein said first setting member has a second switch connected between said pulse generator and said second counter, and said second setting member has a third switch connected between said pulse generator and said third counter.

37. An apparatus according to claim 36, further including warning means for producing a warning signal each time one pulse is applied to said first, second and third counters.

38. An apparatus according to claim 36, further including display means responsive to the outputs of said first, second and third counters for displaying the set mode and the preset values of exposure factors.

39. An apparatus according to claim 33, further including:

(a) a second switch accessible from the outside of the camera housing to set a maximum possible number of frames of the used film;
(b) a second counter connected through said second switch to said pulse generating means upon actuation of said second switch to count the pulse train in order to set that number;
(c) a third counter cooperative with an internal mechanism of the camera for advancing one count each time one exposure has been completed;
(d) comparing means for comparing the outputs of said second and third counters when the difference therebetween attains a predetermined value for producing a warning signal; and
(e) warning means for converting said warning signal to an audible or visible signal.

40. An apparatus according to claim 39, further including a third switch cooperative with a back cover of the camera and operating upon opening of said back cover to reset said second and third counters.

41. An automatic exposure control apparatus for a camera including:
(A) light measuring means for producing an electrical signal proportional to the brightness level of an object being photographed;
(B) exposure factor setting means for producing electrical signals proportional to the preset values of exposure factors;
(C) exposure value computing means responsive to the outputs of said light measuring means and said exposure factor setting means for producing an output;
(D) shutter control means;
(E) diaphragm control means;
(F) exposure mode selecting means responsive to a first signal for directing the output of said computing means to said shutter control means and responsive to a second signal for directing the output of said computing means to said diaphragm control means;
(G) pulse generating means for producing a pulse train;
(H) a first counter for counting the pulse train for producing either one of said first and said second signals depending upon the number of pulses counted; and
(I) a first switch accessible from the outside of the camera, said first switch being arranged to cause a number of pulses corresponding to the switching operation time of the first switch to be applied to said first counter and to cause the first counter to produce either the first signal or the second signal thereof according to the count value of the first counter; and wherein said first counter has a trigger terminal connected to the output of said pulse generating means, and has input terminals receptive of mode information supplied from the outside of the camera with selection of one of a number of different mode setting members, so that when the mode member is loaded, a signal representative of the selected load is applied to said first counter and the reception of the pulse train at the trigger terminal of said counter is inhibited, while said first counter applies either one of said first and second signals to said mode selecting means depending upon the input signal at the input terminals thereof.

42. An automatic exposure control apparatus for a camera including:

(A) light measuring means for producing an electrical signal proportional to the object brightness level.

(B) exposure factor setting means for producing electrical signals proportional to the preset values of exposure factors, said means being associated with correcting means responsive to a control signal for producing an electrical signal proportional to a corrected value of exposure factor;

(C) exposure value computing means responsive to the output of said light measuring means and said exposure factor setting means for producing an output;

(D) shutter control means;

(E) diaphragm control means;

(F) exposure mode selecting means for directing the output of said computing means to either one of said shutter and said diaphragm control means, said means having a first gate circuit which is enabled by a first signal so that the output of said computing means is applied to said shutter control means, and a second gate circuit which is enabled by a second signal so that the output of said computing means is applied to said diaphragm control means;

(G) first detecting means for detecting whether or not the output of said first gate circuit is outside the dynamic range of said shutter control means and, when such output is outside the dynamic range, for producing the signal which is applied to said correcting means;

(H) second detecting means for detecting whether or not the output of said second gate circuit is outside the dynamic range of said diaphragm control means and, when such output is outside the dynamic range, for producing the signal which is applied to the correcting means;

(I) pulse generating means for producing a pulse train;

(J) a first counter for counting the pulse train for producing either one of said first and second signals dependent upon the number of pulses counted; and (K) a first switch accessible from the outside of the camera, said first switch being arranged to cause a number of pulses corresponding to the switching operation time of the first switch to be applied to said first counter and to cause the first counter to produce either the first signal or the second signal thereof according to the count value of the first counter.

43. An apparatus according to claim 42, further including gate means interposed between said first counter and said mode selecting means, and wherein said first counter produces one of four signals, namely, a shutter preselection signal, a shutter preselection magic signal, a diaphragm preselection signal and a diaphragm preselection magic signal, so that when said first counter produces either one of said shutter preselection signal and said shutter preselection magic signal, said gate means produces the second signal which is applied to said mode selecting means, while when said first counter produces either one of said diaphragm preselection signal and said diaphragm preselection magic signal, said gate means produces the first signal which is applied to said mode selecting means.

44. An apparatus according to claim 42, wherein said first detecting means is rendered operative when said first counter produces said diaphragm preselection magic signal, and said second detecting means is rendered operative when said first counter produces said shutter preselection magic signal.

45. An apparatus according to claim 42, further including:

(a) a second switch for use in setting a maximum possible number of frames of the used film accessible from the outside of the camera housing;

(b) a second counter connected through said second switch to said pulse generating means upon actuation of said second switch to count the pulse train in order to set that number;

(c) a third counter cooperative with an internal mechanism of the camera for advancing one count each time one frame has been exposed;

(d) comparing means for comparing the outputs of said second and third counters with each other when the difference therebetween attains a predetermined value for producing a warning signal; and (e) warning means for converting said warning signal to an audible or visible signal.

46. An apparatus according to claim 45, further including a third switch cooperative with a back cover of the camera and operating upon opening of the back cover to reset said second and third counters.

47. An automatic exposure control apparatus for a camera including:

(A) light measuring means for producing an electrical signal proportional to the object brightness level;

(B) exposure factor setting means for producing electrical signals proportional to the preset values of exposure factors, said means being associated with correcting means responsive to a control signal for producing an electrical signal proportional to a corrected value of exposure factor;

(C) exposure value computing means responsive to the output of said light measuring means and said exposure factor setting means for producing an output;

(D) shutter control means;

(E) diaphragm control means;

(F) exposure mode selecting means for directing the output of said computing means to either one of said shutter and said diaphragm control means, said means having a first gate circuit which is enabled by a first signal so that the output of said computing means is applied to said shutter control means, and a second gate circuit which is enabled by a second signal so that the output of said computing means is applied to said diaphragm control means;

(G) first detecting means for detecting whether or not the output of said first gate circuit is outside the dynamic range of said shutter control means and, when such output is outside the dynamic range, for producing the signal which is applied to said correcting means;

(H) second detecting means for detecting whether or not the output of said second gate circuit is outside the dynamic range of said diaphragm control means and, when such output is outside the dynamic range, for producing the signal which is applied to the correcting means;

(I) pulse generating means for producing a pulse train;

(J) a first counter for counting the pulse train for producing either one of said first and second signals dependent upon the number of pulses counted; and (K) a first switch accessible from the outside of the camera, said first switch being arranged to cause a number of pulses corresponding to the switching operation time of the first switch to be applied to said first counter and to cause the first counter to produce either the first signal or the second signal thereof according to the count value of the first counter; and wherein said first counter has a trigger terminal connected to the output of said pulse generating means and has input terminals receptive of mode information supplied from the outside of the camera with selection of one of a number of different mode setting members, so that when the mode setting member is loaded, a signal representative of the selected mode is applied to said first counter so that the reception of the pulse train at the trigger terminal of said first counter is inhibited, while said first counter applies either one of said first and second signals to said mode selecting means depending upon the input signal at the input terminals thereof.

48. An automatic exposure control apparatus for a camera including:
   (A) light measuring means for producing an electrical signal proportional to the brightness level of an object being photographed;
   (B) pulse generating means for producing a pulse train;
   (C) exposure factor setting means having;
      (1) a first switch accessible from outside of the camera housing for use in setting an exposure factor;
      (2) a first counter for setting a value of the exposure factor, said first counter being arranged to receive and count a number of pulses corresponding to the switching operation time of said first switch applied thereto from said pulse generating means; and
      (3) a second counter which is provided for a setting value changing purpose and is receptive of the count output of said first counter, said second counter being arranged to alter the count output of the first counter by counting oscillation pulses produced by said pulse generating means while a detecting signal is being applied thereto;
   (D) exposure value computing means responsive to the outputs of said light measuring means and said second counter;
   (E) shutter control means;
   (F) diaphragm control means;
   (G) exposure mode selecting means for directing the output of said computing means to either one of said shutter and said diaphragm control means, said means having a first gate circuit which is enabled by one of first and second signals so that the output of said computing means is applied to said shutter control means, and a second gate circuit which is enabled by one of third and fourth signals so that the output of said computing means is applied to said diaphragm control means;
   (H) first detecting means rendered operative by said second signal to detect whether or not the output of said first gate circuit is outside the dynamic range of said shutter control means and, when such output is outside the range of the dynamic range, producing an actuating signal which is applied to said second counter;
   (I) second detecting means rendered operative by said fourth signal to detect whether or not the output of said second gate circuit is outside the dynamic range of said diaphragm control means and, when such output is outside the dynamic range, for producing an actuating signal which is applied to said second counter;
   (J) a second switch accessible from the outside of the camera housing for use in setting a mode; and
   (K) a third counter arranged to receive and count a number of pulses which corresponds to the switching operation time of generating means, said third counter being further arranged to apply one of the first, second, third and fourth signals to said exposure mode selecting means according to the count value obtained at the third counter.

49. An apparatus according to claim 48, further including warning means for producing a warning signal each time one pulse is applied to said first and third counters.

50. An apparatus according to claim 48, further including display means responsive to the outputs of said first and third counters for displaying the selected mode and the preset value of exposure factor.

51. An automatic exposure control apparatus for a camera including:
   (A) light measuring means for producing an electrical signal proportional to the brightness level of an object being photographed;
   (B) exposure factor setting means for producing electrical signals proportional to the preset values of exposure factors;
   (C) exposure value computing means responsive to the outputs of said light measuring means and said exposure factor setting means for producing an output;
   (D) shutter control means;
   (E) diaphragm control means;
   (F) exposure mode selecting means for directing the output of said computing means to either or both said shutter and said diaphragm control means, said means responsive to a first signal directing the output of said computing means to said shutter control means, responsive to a second signal directing the output of said computing means to said diaphragm control means, and responsive to a third signal directing the output of said computing means to both said shutter and said diaphragm control means;
   (G) pulse generating means for producing a pulse train;
   (H) a first counter for counting the pulse train for producing one of said first, second and third signals which is applied to said exposure mode selecting means depending upon the number of pulses counted; and
   (I) a first switch accessible from the outside of the camera, said first switch being arranged to cause a number of pulses corresponding to the switching operation time of the first switch to be applied to said first counter and to cause the first counter to produce one of the first, second and third signals according to the count value obtained at the first counter.

52. An apparatus according to claim 51, wherein said exposure mode selecting means has a first gate circuit which is enabled by said first signal so that the output of said computing means is applied to said shutter control means, a second gate circuit which is enabled by said second signal so that the output of said computing means is applied to said diaphragm control means, and a third gate circuit which is enabled by said third signal so that the output of said computing means is applied to both said shutter and said diaphragm control means.

53. An apparatus according to claim 52, wherein said exposure factor setting means has a first setting member for setting film sensitivity, and a second setting member for setting a preselected exposure factor, said first setting member having a second counter for counting the pulse train; and said second setting member having a third counter for counting the pulse train.

54. An apparatus according to claim 53, wherein said first setting member has a second switch connected between said pulse generating means and said second counter, and said second setting member has a third switch connected between said pulse generating means and said third counter.

55. An apparatus according to claim 54, wherein said exposure value computing means has a first computing member for computing the outputs of said light measuring means, said second and third counters for producing an output which is applied to said first and second gate circuits, and a second computing member for computing the outputs of said light measuring means and said second counter for producing an output which is applied to said third gate circuit.

56. An apparatus according to claim 54, further including display means responsive to the outputs of said first, second and third counters for displaying the selected mode and the preset values of exposure factors.

57. An apparatus according to claim 51, further including:
  (a) a second switch accessible from the outside of the camera housing for use in setting a maximum possible number of frames of the used film;
  (b) a second counter connected through said second switch to said pulse generating means upon actuation of said second switch to count the pulse train in order to set that number;
  (c) a third counter cooperative with an internal mechanism of the camera to advance one count each time one frame has been exposed;
  (d) comparing means for comparing the outputs of said second and third counters with each other upon attainment of the difference therebetween to a predetermined value for producing an output signal;
  (e) warning means for converting said output signal of said comparing means to an audible or visible signal.

58. An apparatus according to claim 57, further including a third switch cooperative with a back cover of the camera housing and operating upon opening of said cover to reset said second and third counters.

59. An automatic exposure control apparatus for a camera including:
  (A) light measuring means for producing an electrical signal proportional to the brightness level of an object being photographed;
  (B) exposure factor setting means for producing electrical signals proportional to the preset value of exposure factors;
  (C) exposure value computing means responsive to the outputs of said light measuring means and said exposure factor setting means for producing an output;
  (D) shutter control means;
  (E) diaphragm control means;
  (F) exposure mode selecting means for directing the output of said computing means to either or both said shutter and said diaphragm contol means, said means responsive to a first signal directing the output of said computing means to said shutter control means, responsive to a second signal directing the output of said computing means to said diaphragm control means, and responsive to a third signal directing the output of said computing means to both said shutter and said diaphragm control means;
  (G) pulse generating means for producing a pulse train;
  (H) a first counter for counting the pulse train for producing one of said first, second and third signals which is applied to said exposure mode selecting means depending upon the number of pulses counted; and
  (I) a first switch accessible from the outside of the camera, said first switch being arranged to cause a number of pulses corresponding to the switching operation time of the first switch to be applied to said first counter and to cause the first counter to produce one of the first, second and third signals according to the count value obtained at the first counter: wherein said first counter has a trigger terminal connected to the output of said pulse generating means, and has input terminals receptive of mode information supplied from the outside of the camera housing with selection of one of a number of different mode setting members so that when the mode setting member is loaded, a signal representative of the selected mode is applied to said first counter so that the reception of the pulse train at the trigger terminal of said counter is inhibited, while said first counter applies either one of said first, second and third signals to said mode selecting means depending upon the input signal at the input terminals thereof.

60. An atuomatic exposure control apparatus for a camera including:
  (A) light measuring means for producing an electrical signal proportional to the brightness level of an object being photographed;
  (B) exposure factor setting means for producing electrical signals proportional to the preset values of exposure factors, said means being associated with correcting means for correcting the preset values of exposure factors in response to a control signal;
  (C) exposure value computing means responsive to the outputs of said light measuring means and said exposure factor setting means for producing an output;
  (D) shutter control means;
  (E) diaphragm control means;
  (F) exposure mode selecting means for directing the output of said computing means to either or both said shutter and said diaphragm control means, said means having a first gate circuit which is enabled by a first signal so that the output of said computing means is applied to said shutter control means, a second gate circuit which is enabled by a second signal so that the output of said computing means is applied to said diaphragm control means, and a third gate circuit which is enabled by a third signal so that the output of said computing means is applied to both said shutter and said diaphragm control means;
  (G) first detecting means for detecting whether or not the output of said first gate circuit is outside the dynamic range of said shutter control means and, when such signal exceeds the dynamic range, producing an actuating signal which is applied to said correcting means;

(H) second detecting means for detecting whether or not the output of said second gate circuit is outside the dynamic range of said diaphragm control means and, when such signal is outside the dynamic range, producing an actuating signal which is applied to said correcting means;

(I) pulse generating means for producing a pulse train;

(J) a first counter connected to the output of said pulse generating means for producing one of said first, second and third signals which is applied to said mode selecting means depending upon the number of pulses counted; and (K) a first switch accessible from the outside of the camera, said first switch being arranged to cause a number of pulses corresponding to the switching operation time of the first switch to be applied to said first counter and to cause the first counter to produce one of the first, second and third signals according to the count value obtained at the first counter.

61. An apparatus according to claim 60, further including gate means interposed between said first counter and said mode selecting means, and wherein said first counter responsive to signals applied to input terminals thereof produces one of five signals, namely, a shutter preselection signal, a shutter preselection magic signal, a diaphragm preselection signal, a diaphragm preselection magic signal, and a program signal, so that when said first counter produces one of said shutter preselection signal and said shutter preselection magic signal, said gate means produces said first signal; when said first counter produces one of said diaphragm preselection signal and said diaphragm preselection magic signal, said gate means produces said second signal; and when said first counter produces the program signal, said gate means produces said third signal.

62. An apparatus according to claim 61, wherein said first detecting means is rendered operative when said first counter produces said diaphragm preselection magic signal, and said second detecting means is rendered operative when said first counter produces said shutter preselection magic signal.

63. An apparatus according to claim 60, further including:
 (a) a second switch accessible from the outside of the camera housing for use in setting a maximum possible number of frames of the used film;
 (b) a second counter connected through said second switch to said pulse generating means upon actuation of said second switch to count the pulse train in order to set that number;
 (c) a third counter for advancing one count each time one frame has been exposed;
 (d) comparing means for comparing the outputs of said second and third counters with each other when the difference therebetween attains a predetermined value for producing a warning signal; and
 (e) warning means for converting said warning signal to an audible or visible signal.

64. An apparatus according to claim 63, further including a third switch cooperative with a back cover of the camera housing and operating upon opening of said cover to reset said second and third counters.

65. An automatic exposure control apparatus for a camera including:
 (A) light measuring means for producing an electrical signal proportional to the brightness level of an object being photographed;
 (B) exposure factor setting means for producing electrical signals proportional to the preset values of exposure factors, said means being associated with correcting means for correcting the preset values of exposure factors in response to a control signal;
 (C) exposure value computing means responsive to the outputs of said light measuring means and said exposure factor setting means for producing an output;
 (D) shutter control means;
 (E) diaphragm control means;
 (F) exposure mode selecting means for directing the output of said computing means to either or both said shutter and said diaphragm control means, said means having a first gate circuit which is enabled by a first signal so that the output of said computing means is applied to said shutter control means, a second gate circuit which is enabled by a second signal so that the output of said computing means is applied to said diaphragm control means, and a third gate circuit which is enabled by a third signal so that the output of said computing means is applied to both said shutter and said diaphragm control means;
 (G) first detecting means for detecting whether or not the output of said first gate circuit is outside the dynamic range of said shutter control means and, when such signal exceeds the dynamic range, producing an actuating signal which is applied to said correcting means;
 (H) second detecting means for detecting whether or not the output of said second gate circuit is outside the dynamic range of said diaphragm control means and, when such signal is outside the dynamic range, producing an actuation signal which is applied to said correcting means;
 (I) pulse generating means for producing a pulse train;
 (J) a first counter connected to the output of said pulse generating means for producing one of said first, second and third signals which is applied to said mode selecting means depending upon the number of pulses counted; and
 (K) a first switch accessible from the outside of the camera, said first switch being arranged to cause a number of pulses corresponding to the switching operation time of the first switch to be applied to said first counter and to cause the first counter to produce one of the first, second and third signals according to the count value obtained at the first counter: and wherein said first counter has a trigger terminal connected to the output of said pulse generating means, and has input terminals receptive of mode information supplied from the outside of the camera with the selection of one of a number of different mode setting members, so that when the mode setting member is loaded, a signal representative of the selected mode is applied to said first counter to that the reception of the pulse train at the trigger terminal of said counter is inhibited, while said first counter applies either one of said first, second and third signals to said mode selecting means depending upon the input signal at the input terminals thereof.

66. An automatic exposure control apparatus for a camera including:

(A) light measuring means having;
  (a) a photosensitive element for producing an electrical signal proportional to the brightness level of an object being photographed; and
  (b) analog-to-digital converting means for converting the analog signal of said photosensitive element to a digital signal;

(B) pulse generating means for producing a pulse train;

(C) exposure factor setting means having:
  (a) a first switch accessible from the outside of the camera housing for use in setting a preselected exposure factor;
  (b) a second switch accessible from the outside of the camera housing for use in setting film sensitivity;
  (c) a first counter for setting an exposure value, said first counter being arranged to have a number of pulses corresponding to the switching operation time of said first switch applied thereto from said pulse generating means and to count the pulses thus applied;
  (d) a second counter for setting a film sensitivity value, said second counter being arranged to have a number of pulses corresponding to the switching operation time of said second switch applied thereto from said pulse generating means and to count the pulses thus applied; and
  (e) a third counter which is provided for an exposure setting value altering purpose and is receptive of the output of said first counter, said third counter being arranged to alter the count output of the first counter by counting oscillation pulses produced by said pulse generating means while a detecting signal is being applied thereto;

(D) exposure value computing means responsive to the outputs of said light measuring means and said exposure factor setting means for producing an output in digital form, said means having:
  (a) a first computing member for digitally computing the outputs of said analog-to-digital converting means, said first counter and said second counter; and
  (b) a second computing member for digitally computing the outputs of said analog-to-digital converting means and said second counter;

(E) shutter control means;
(F) diaphragm control means;
(G) exposure mode selecting means having:
  (a) a first gate circuit enabled by either one of first and second signals to direct the output of said first computing means to said shutter control means; and
  (b) a second gate circuit enabled by either one of third or fourth signals to direct the output of said first computing means to said diaphragm control means; and
  (c) a third gate circuit enabled by a fifth signal to direct the output of said second computing member to both said shutter and said diaphragm control means;

(H) first detecting means rendered operative by said second signal to detect whether or not the output of said first gate circuit is outside the dynamic range of said shutter control means and, when such output is outside the dynamic range, producing a detecting signal which is applied to said third counter;

(I) second detecting means rendered operative by said fourth signal to detect whether or not the output of said second gate circuit is outside the dynamic range of said diaphragm control means and, when such output is outside the dynamic range, producing a detecting signal which is applied to said third counter;

(J) a third switch accessible from the outside of the camera housing for use in setting a mode; and (K) a fourth counter arranged to receive and count a number of pulses which corresponds to the switching operation time of said third switch and are applied thereto from the pulse generating means, said fourth counter being further arranged to apply one of the first, second, third, fourth and fifth signals to said exposure mode selecting means according to the count value obtained at the fourth counter;

67. An apparatus according to claim 66, further including warning means for producing a warning signal each time one pulse is applied to one of said first, second and fourth counters.

68. An apparatus according to claim 66, further including display means responsive to the outputs of said first, second and fourth counters for displaying the selected mode and the preset values of exposure factors.

* * * * *